US012573409B2

United States Patent
(12) United States Patent
Neuendorf et al.

(10) Patent No.: US 12,573,409 B2
(45) Date of Patent: Mar. 10, 2026

(54) AUDIO ENCODER, METHOD FOR PROVIDING AN ENCODED REPRESENTATION OF AN AUDIO INFORMATION, COMPUTER PROGRAM AND ENCODED AUDIO REPRESENTATION USING IMMEDIATE PLAYOUT FRAMES

(71) Applicant: Fraunhofer-Gesellschaft zur Förderung der angewandten Forschung e.V., Munich (DE)

(72) Inventors: Max Neuendorf, Erlangen (DE); Nikolaus Rettelbach, Erlangen (DE); Christina Mittag, Erlangen (DE); Daniel Richter, Erlangen (DE); Agathe Deniau, Erlangen (DE); Wahaj Aslam, Erlangen (DE); Ingo Hofmann, Erlangen (DE); Bernd Herrmann, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 194 days.

(21) Appl. No.: 18/582,428

(22) Filed: Feb. 20, 2024

(65) Prior Publication Data

US 2024/0194207 A1 Jun. 13, 2024

Related U.S. Application Data

(63) Continuation of application No. PCT/EP2022/073073, filed on Aug. 18, 2022.

(30) Foreign Application Priority Data

Aug. 19, 2021 (EP) .................................... 21192257

(51) Int. Cl.
*G10L 19/002* (2013.01)
*G10L 19/00* (2013.01)
(Continued)

(52) U.S. Cl.
CPC .......... *G10L 19/002* (2013.01); *G10L 19/032* (2013.01); *G10L 19/12* (2013.01); *G10L 2019/0001* (2013.01)

(58) Field of Classification Search
None
See application file for complete search history.

(56) References Cited

U.S. PATENT DOCUMENTS 10,614,824 B2 * 4/2020 Fischer ................. G10L 19/167
11,972,769 B2 * 4/2024 Fersch .................... G06F 3/165
(Continued)

FOREIGN PATENT DOCUMENTS

| | | | |
|---|---|---|---|
| EP | 2863386 | A1 | 4/2015 |
| WO | 2018130577 | A1 | 7/2018 |
| WO | 2020038938 | A1 | 2/2020 |

OTHER PUBLICATIONS

International Search Report and Written Opinion in PCT/EP2022/073073, mailed Oct. 25, 2022, 18 pages.
(Continued)

*Primary Examiner* — Hemant S Patel
(74) *Attorney, Agent, or Firm* — ARENTFOX SCHIFF LLP

(57) ABSTRACT

An audio encoder is disclosed for providing an encoded representation of an audio information encodes a sequence of audio frames. The audio encoder provides one or more immediate playout frames including a representation of a current audio frame, preceding the current audio frame. The audio encoder provides the representations of the current frame and of the one or more audio frames preceding the
(Continued)

current audio frame, such that these representations are decodable using a same decoder configuration. The audio encoder provides the representations of the one or more audio frames preceding the current audio frame, which are included into the immediate playout frame, using a modified encoding functionality, which encodes an audio frame using a smaller number of bits than a normal encoding functionality, which is used for the encoding of the current audio frame.

21 Claims, 4 Drawing Sheets

(51) Int. Cl.
*G10L 19/032* (2013.01)
*G10L 19/12* (2013.01)

(56) References Cited

U.S. PATENT DOCUMENTS

2005/0261900 A1* 11/2005 Ojala ...................... G10L 19/22 704/223
2007/0223660 A1* 9/2007 Dei ......................... G10L 19/24 704/E19.044

OTHER PUBLICATIONS

"Information technology—High efficiency coding and media delivery in heterogeneous environments—Part 3: 3D audio", International Standard, ISO/IEC 23008-3:2022(E), Third edition, Aug. 2022, pp. 1-882.
"Information technology—MPEG audio technologies Part 3: Unified speech and audio coding", International Standard, ISO/IEC 23003-3:2020(E), Second edition, Jun. 2020, pp. 1-348.

* cited by examiner

AUDIO ENCODER, METHOD FOR PROVIDING AN ENCODED REPRESENTATION OF AN AUDIO INFORMATION, COMPUTER PROGRAM AND ENCODED AUDIO REPRESENTATION USING IMMEDIATE PLAYOUT FRAMES

CROSS-REFERENCES TO RELATED APPLICATIONS

This application is a continuation of co-pending International Application No. PCT/EP2022/073073, filed Aug. 18, 2022, which claims priority to European Application No. EP 21 192 257.0, filed Aug. 19, 2021, the entire contents of each of which are incorporated herein by reference.

TECHNICAL FIELD

Exemplary aspects according to the invention are related to audio encoders, methods for providing an encoded representation of an audio information, computer programs and encoded audio representations using immediate playout frames. Moreover, additional aspects are related to or comprise audio encoders, methods for providing an encoded representation of an audio information, computer programs and encoded audio representations using immediate playout frames.

BACKGROUND

In the following, the technical problem underlying the invention will be described. However, it should be noted that any features, functionalities and details described in this section may optionally be introduced into embodiments according to the invention, both individually and taken in combination.

For example, MPEG-D USAC implements Immediate Playout Frames (IPFs) as an explicit mechanism of Stream Access Points (SAPs) to support, for example, seamless switching in adaptive streaming use cases. For example, per definition an IPF consists of (or comprises) the current Access Unit (AU) AU(n) plus the previous AU(n−1), (which is transmitted as part of the extension payload of the frame and is known as Audio Pre-Roll).

For example, depending on the encoder configuration, it is often necessary to add not only the previous AU(n−1), but to add up to three preceding access units (AU(n−1), AU(n−2), AU(n−3)), for example, to set the decoder to the required state for seamless switching. As a general rule: Higher bit rates require, for example, one pre-roll AU. Lower bitrates require, for example, two or three pre-roll AUs.

Additionally, the current AU and the first Audio Pre-Roll may, for example, need to be independently decodable (independency flag set to 1; indepFlag=1), which makes them slightly more bit demanding.

Reference is made to FIG. 4. FIG. 4 shows a schematic visualization of a series of Access Units AU(n−2), . . . , AU(n+1), with AU(n) being, as an example, a current Access Unit and AU(n−1) its previous Access Unit. Hence, AU(n−2) may be an Access Unit preceding AU(n−1) and accordingly, Access Unit AU(n+1) may be a subsequent Access Unit with regard to AU(n). As explained before, an IPF may comprise a current Access Unit AU(n) and a previous Access Unit AU(n−1), wherein Access Unit AU(n−1) may be transmitted as a part of the extension payload of the frame, e.g. known as Audio Pre-Roll. FIG. 4 visualizes the above explained setting of the independency flag for AU(n) and AU(n−1).

These requirements will lead to IPFs that can become, for example, up to ~4 times as big in size as a normal AU. This can, for example, lead to various problems:

- The enormous peaks in bit demand because of IPFs will, for example, lead to bad and/or imbalanced audio quality, especially at lower bit rates. This is because the bits needed to encode the IPF are, for example, taken away from the bit budget of the actual non-IPF playout frames of the bit stream.
- Complicated measures may, for example, have to be implemented in order to intelligently and carefully manage the bit demand across frames of an audio stream, which, for example, makes the encoder more prone to instabilities.
- At lower rates, the imbalance between IPFs and regular AUs may, for example, become bigger, for example, exponentiating the above problem leading to the situation where the lowest claimed bit rates (e.g. 12 kbit/s stereo) cannot be achieved.
- The IPF can, for example, become too big to fulfill the decoder buffer requirements or the IPF causes a violation of the maximum allowed size of one access unit. This, for example, leads to potential encoder or decoder crash or dropping of the AU at the decoder with subsequent frame loss concealment, leading to much degraded audio quality.
- This leads, for example, to an effective upper bit rate limit of half of what a comparable AAC-LC encoder can operate at because IPFs have roughly twice the size of a regular AU (288 kbit/s stereo for USAC vs. 576 kbit/s for AAC-LC). However, being able to achieve very high bit rates is an important marketing claim of USAC.

With regard to conventional solutions, so far, two suboptimal solutions are known.

1. To ensure a stable encoding process, the encoder employs a contingency strategy by discarding Audio Pre-Roll AUs in an IPF in cases where buffer requirements will be violated or the maximum AU size is exceeded. This leads to the loss of the seamless switching property of the stream for these frames.
2. The encoder does not take the bit demand of the audio pre-roll into account such that the audio quality of the stream is not harmed. However, this will cause the resulting average bit rate to be slightly higher than what the user of the encoder requested as a desired target bit rate of the stream. In addition, this strategy can lead to decoder buffer requirement violations and AUs exceeding the maximum allowed size.

SUMMARY OF THE INVENTION

Therefore, it is desired to get a concept for providing IPFs which makes a better compromise between a quality of an audio signal obtained using the IPFs, a complexity of the determination and provision of the IPFs, a bit rate efficiency using the IPFs, and a size of the IPFs.

Accordingly, an embodiment may have an audio encoder for providing an encoded representation of an audio information on the basis of an input audio information, wherein the audio encoder is configured to encode a sequence of audio frames, wherein the audio encoder is configured to provide one or more immediate playout frames comprising a representation of a current audio frame and encoded representations of one or more audio frames preceding the current audio frame, wherein the audio encoder is configured to provide the representation of the current frame and the representations of the one or more audio frames preceding the current audio frame such that the representation of the current frame and the representations of the one or more audio frames preceding the current audio frame are decodable using a same decoder configuration, and wherein the audio encoder is configured to provide the representations of the one or more audio frames preceding the current audio frame, which are included into the immediate playout frame, using a modified encoding functionality which is adapted to encode an audio frame using a smaller number of bits than a normal encoding functionality which is used for the encoding of the current audio frame.

Another embodiment may have a method for providing an encoded representation of an audio information on the basis of an input audio information, wherein the method comprises encoding a sequence of audio frames, wherein the method comprises providing one or more immediate playout frames comprising a representation of a current audio frame and encoded representations of one or more audio frames preceding the current audio frame, wherein the method comprises providing the representation of the current frame and the representations of the one or more audio frames preceding the current audio frame such that the representation of the current frame and the representations of the one or more audio frames preceding the current audio frame are decodable using a same decoder configuration, and wherein the method comprises providing the representations of the one or more audio frames preceding the current audio frame, which are included into the immediate playout frame, using a modified encoding functionality which is adapted to encode an audio frame using a smaller number of bits than a normal encoding functionality which is used for the encoding of the current audio frame.

Another embodiment may have a non-transitory digital storage medium having a computer program stored thereon to perform the method for providing an encoded representation of an audio information on the basis of an input audio information, wherein the method comprises encoding a sequence of audio frames, wherein the method comprises providing one or more immediate playout frames comprising a representation of a current audio frame and encoded representations of one or more audio frames preceding the current audio frame, wherein the method comprises providing the representation of the current frame and the representations of the one or more audio frames preceding the current audio frame such that the representation of the current frame and the representations of the one or more audio frames preceding the current audio frame are decodable using a same decoder configuration, and wherein the method comprises providing the representations of the one or more audio frames preceding the current audio frame, which are included into the immediate playout frame, using a modified encoding functionality which is adapted to encode an audio frame using a smaller number of bits than a normal encoding functionality which is used for the encoding of the current audio frame, when said computer program is run by a computer.

Another embodiment may have an encoded audio representation, wherein the encoded audio representation comprises a sequence of encoded audio frames, wherein the encoded audio representation comprises one or more immediate playout frames comprising a representation of a current audio frame and encoded representations of one or more audio frames preceding the current audio frame, wherein the representation of the current frame and the representations of the one or more audio frames preceding the current audio frame are decodable using a same decoder configuration, and wherein the representations of the one or more audio frames preceding the current audio frame, which are included into the immediate playout frame, are provided using a modified encoding functionality which is adapted to encode an audio frame using a smaller number of bits than a normal encoding functionality which is used for the encoding of the current audio frame, or wherein the encoded representations of the one or more audio frames preceding the current audio frame, which are included into the immediate playout frame, comprise a smaller number of bits than the encoded representation of the current frame.

Embodiments according to the invention comprise an audio encoder for providing an encoded representation of an audio information on the basis of an input audio information, wherein the audio encoder is configured to encode a sequence of audio frames, e.g. in such a manner that a decoding of a given audio frame uses information, e.g. buffer states, obtained on the basis of one or more preceding audio frames, wherein, for example, the audio frames may be considered as access units, AU.

Furthermore, the audio encoder is configured to provide one or more immediate playout frames, e.g. designated as IPFs, comprising a representation of a current, e.g. currently encoded, audio frame, or for example access unit AU, and encoded representations of one or more audio frames, or for example access units, preceding the current audio frame, wherein optionally the encoded representations of one or more audio frames preceding the current audio frame may be considered as an audio pre-roll. It should also be noted that in addition to the representation of the current frame and the representations of the one or more previous frames (Pre-Rolls), a decoder configuration (or decoder config) may, for example be a specific part of the IPF; advantageously, the decoder config may, for example, be transferred exactly one time in the IPF, as a part of the audio pre-roll extension element.

Moreover, the audio encoder is configured to provide the representation of the current frame and the representations of the one or more audio frames preceding the current audio frame (which may optionally be included into the immediate playout frame), such that the representation of the current frame and the representations of the one or more audio frames preceding the current audio frame (which may optionally be included into the immediate playout frame) are decodable using a same decoder configuration, e.g. such that there is no need for a decoder-re-initialization between the decoding of the representations of the one or more frames preceding the current frame and the decoding of the representation of the current frame.

In addition, the audio encoder is configured to provide the representations of the one or more audio frames preceding the current audio frame, which are included into the immediate playout frame, using a modified encoding functionality (e.g. using a modified encoder bitrate setting, or using a modified encoder quantization setting, or using a modified masking threshold of a psychoacoustic model, or using a reduction of a spectral band replication (SBR) payload, or using a reduction of a multichannel (e.g. stereo coding) payload, or using a replacement of an ACELP encoding by a TCX encoding with coarse quantization, or using a modified acelp_core_mode parameter, or using a deactivation of a switching to an increased temporal resolution) which is adapted to encode an audio frame using a smaller number of bits than a normal encoding functionality which is used for the encoding of the current audio frame.

The inventors recognized that providing the representation of the current frame and the representations of the one or more audio frames preceding the current audio frame, such that these representations are decodable using a same decoder configuration, based on a modified encoding functionality for the representations of the one or more audio frames preceding the current audio frame, resulting in a smaller number of bits of a respective representation compared to a normal encoding functionality, which may be used for the encoding of the current audio frame, may allow to exploit the advantages of IPFs, to support seamless switching between bitrates and may allow to mitigate or even to overcome drawbacks of respective conventional approaches, for example, with regard to excessive sizes of the encoded representations of the preceding audio frames.

The inventors recognized that different encoding schemes may be applied for the encoding of the current audio frame, using a normal, or for example "default", or for example "core", or for example "regular" encoding functionality, and the encoding of the audio frames preceding the current audio frame, using the modified encoding functionality (which may, for example, be the normal encoding functionality modified with regard to its encoding settings or parameters, for which, as an example, a portion of the configuration of the encoder may be adapted, wherein said portion may not have an influence on provided configuration data for a respective decoder), for example, a functionality that allows to reduce the representations of the one or more audio frames preceding the current audio frame to a minimum of data that allows to set a corresponding decoder in a respective state and/or configuration or set a corresponding decoder in a respective state maintaining a current configuration (e.g. without adapting a current configuration), for a, e.g. independent, decoding of the representations of the current audio frame and the preceding audio frames without re-initialization in between.

In simple words and as an example, the inventors recognized that an encoding of the Audio Pre-Roll (e.g. comprising representations of one or more preceding audio frames) of an IPF may be modified or adapted, such that these audio frames are, for example, encoded more coarsely, with less bits, compared to the normal encoding functionality, but such that an information required for bringing a respective decoder into a desired state may be fully included, such that the decoder may be set up to decode subsequent normally encoded frames, for example, as if the preceding audio frames would have been encoded normally, e.g. without changing a configuration of the decoder and hence without having to re-initialize the decoder.

Hence, as an example, in contrast to the normal encoding functionality or method, the modified encoding functionality or method may provide encoded representations of the preceding audio frames with data portions that do not change, or do only change in a minor, e.g. non-impactful, way, the configuration of a respective decoder, but that allow to put the decoder into a desired state (e.g. a state based on which a subsequent, e.g. differential, decoding may be performed), e.g. a same state that would be reached or set based on receiving respective normally encoded frames.

According to further embodiments of the invention, the audio encoder is configured to use a modified encoding functionality, in which a bitrate setting or a bitrate limit is reduced when compared to the normal encoding functionality (which may, for example, be used for the encoding of the current audio frame), for providing the representations of the one or more audio frames preceding the current audio frame, which may, for example, be included into the immediate playout frame, e.g. while keeping other encoding parameters unchanged, to thereby avoid the need for a decoder re-initialization. Hence, a normal encoding functionality may be adapted with low effort by adjusting the bitrate in order to provide the modified encoding functionality. Therefore, hardware and computation methods may be reused.

According to further embodiments of the invention, the audio encoder is configured to use the bitrate setting or bitrate limit for deciding how many bits are allocated to an encoding of different spectral values, wherein, for example, the audio encoder may be configured to adapt a quantization accuracy for encoding spectral values or other parameters in dependence on the bitrate setting, in order to obtain an audio representation which complies with the bitrate setting or the bitrate limit, and/or wherein, for example, the audio encoder may be configured to reduce a range of frequencies which are directly encoded as a base frequency range without using a bandwidth extension in dependence on the reduced bitrate setting or bitrate limit, and/or wherein, for example, the audio encoder may be configured to increase a number of parameters (e.g. SBR parameters) which are quantized or encoded to zero in dependence on the reduced bitrate setting or bitrate limit. Furthermore, as another example, one or more SBR parameters may end up (or are included) "empty" or "as zeros" in the bitstream. As an example, the one or more "empty" or "zero" SBR parameters may not be quantized after their computation, but may be encoded without further quantization. Moreover, for parameters that are tied to zero in order to save bitrate, a computation may optionally be omitted. As explained before, this way, a normal encoding method may be modified without having to redesign the method itself. The modification may be performed by changing parameter settings, such as the bitrate setting or limit. Furthermore, the bitrate setting may hence be used in order to set a granularity of a spectral value quantization.

According to further embodiments of the invention, the reduced bitrate setting or the reduced bitrate limit results in a coarser quantization of one or more parameters, e.g. spectral values. Hence, an information relevant for setting a respective decoder in a desired state may be fully present, e.g. without having to change or without influencing a configuration of the decoder, but wherein an amount of bits needed for the representation of the preceding audio frame may be, e.g. significantly, reduced.

According to further embodiments of the invention, the reduced bitrate setting or the reduced bitrate limit results in a smaller core bandwidth, e.g. when compared to the normal encoding functionality which may be used for the encoding of the current audio frame, while a SBR frequency range remains unchanged, such that there is, for example, a gap between a frequency range encoded by the core coder and a HF SBR band. Hence, as explained before, an information relevant for setting a respective decoder in a desired state may be fully present without having to change or without influencing a configuration of the decoder, but wherein an amount of bits needed for the representation of the preceding audio frame may be, e.g. significantly, reduced.

According to further embodiments of the invention, the audio encoder is configured to leave encoding parameters, a change of which would result in a change of a decoder configuration, e.g. as defined in a usacConfig( ) syntax element for USAC or as defined in the mpegh3daConfig( ) syntax element for MPEG-H 3D Audio, unchanged between the encoding of the current frame and the, e.g. pre-roll, encoding of the one or more audio frames preceding the current audio frame, which may, for example, be included into the immediate playout frame. Hence, a same decoder configuration may be used for the decoding of the representations of the current frame and the preceding frames.

According to further embodiments of the invention, the audio encoder is configured to use a modified encoding functionality, in which a number of bits available for a quantization or for an encoding of one or more parameters, e.g. spectral values, or quantized spectral values, or SBR parameters or quantized SBR parameters, is reduced or limited when compared to normal encoding functionality, which may be used for the encoding of the current audio frame, for providing the representations of the one or more audio frames preceding the current audio frame, which may, for example, be included into the immediate playout frame, e.g. while keeping other encoding parameters unchanged, to thereby avoid the need for a decoder re-initialization, e.g. without changing an overall bitrate setting or an overall bitrate limit. This may lead to a coarser quantization, hence reducing an amount of bits needed for a quantization part of the audio frame, but, e.g. in comparison to a reduction of a bitrate, other parameters, such as a core bandwidth of the respective audio frame may be kept unchanged.

According to further embodiments of the invention, the audio encoder is configured to reduce or limit a quantization accuracy of individual parameters, e.g. spectral values, or of groups or parameters, e.g. 2-tuples or 4-tuples of spectral values, e.g. when compared to the normal encoding functionality which may be used for the encoding of the current audio frame, when using the modified encoding functionality, while, for example, there is no such reduction or limitation, or a less restrictive limitation, when using the normal encoding functionality. Therefore, less relevant parameters, may be quantized more coarsely than more relevant parameters, which may allow to provide a tunable adjustment option for the bit consumption of the representations of the preceding audio frames.

According to further embodiments of the invention, the audio encoder is configured to use a modified encoding functionality, in which a coarser quantization of a MDCT spectrum, e.g. with larger quantization steps, is used when compared to the normal encoding functionality, which may be used for the encoding of the current audio frame, for providing the representations of the one or more audio frames preceding the current audio frame, which may be included into the immediate playout frame, e.g. while keeping other encoding parameters unchanged, to thereby avoid the need for a decoder re-initialization. The inventors recognized that bits for the quantization of a MDCT spectrum may be saved, while still providing encoded representations of one or more preceding audio frames that allow to set a respective decoder in a desired state, e.g. without changing a configuration thereof, for performing a decoding of the representation of the normally encoded current frame, e.g. without re-initialization.

According to further embodiments of the invention, the audio encoder is configured to leave all other parameters, except for the usage of the coarser quantization, unchanged between the normal encoding functionality, which may be used for the encoding of the current audio frame, and the modified encoding functionality. This may allow to provide a simple and low complexity modified encoding functionality, e.g. by only adapting a quantization parameter of the normal encoding functionality, wherein, for example, only the quantization differs, such that normal and modified encoding may lead to a same information for the configuration and/or state of a respective decoder.

According to further embodiments of the invention, the audio encoder is configured to reduce a maximum number of bits that are available for quantizing the spectrum when using the modified encoding functionality, e.g. when compared to the normal encoding functionality. Hence, a bit reduction for the encoded representation may be enforced with low effort.

According to further embodiments of the invention, the audio encoder is configured to re-quantize, e.g. in an iterative manner, the spectrum, e.g. MDCT coefficients representing the spectrum, with increasing quantization step size, until an adapted bit-constraint, e.g. defined by the reduced maximum number of bits available for quantizing the spectrum, is fulfilled, e.g. while keeping all other encoding parameters unchanged. Hence, computationally efficient recursive and/or iterative algorithms may be used in order to provide the modified encoding functionality.

According to further embodiments of the invention, the audio encoder is configured to change a global gain parameter, e.g. when compared to the global gain parameter that would be used, or that has been used, by the normal encoding functionality, in order to obtain a coarser quantization, e.g. in order to have larger quantization steps, which results in smaller quantized spectral values that can be encoded with less bits, when using the modified encoding functionality, wherein the global gain parameter defines a decoder-sided rescaling of decoded spectral values (e.g. MDCT values). This way a normal modification method may be modified without having to redesign the method itself. The modification may be performed by changing parameter settings, such as the global gain parameter.

According to further embodiments of the invention, the audio encoder is configured to use a modified encoding functionality, in which a masking threshold obtained using a psychoacoustic model is changed, e.g. when compared to the case of the normal encoding functionality which may be used for the encoding of the current audio frame, to obtain a coarser quantization, e.g. of one or more spectral values, or of one or more SBR parameters, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. As an example, a modification of the encoding functionality may be performed based on a psychoacoustic model, hence adapting the encoding, such that most relevant information is maintained and less relevant information, e.g. with regard to psychoacoustics, is dropped. Therefore, a good compromise between saved bits and a quality of the encoded representations may be provided.

According to further embodiments of the invention, the audio encoder is configured to use a modified encoding functionality, in which a bandwidth extension bit load, e.g. a bit load for controlling a spectral band replication, is reduced, e.g. when compared to the case of the normal encoding functionality which may be used for the encoding of the current audio frame, e.g. while still complying with the minimum requirements of the bandwidth extension specification, for providing the representations of the one or more audio frames preceding the current audio frame, which may be included into the immediate playout frame, e.g. while keeping other encoding parameters unchanged, to thereby avoid the need for a decoder re-initialization, e.g.

without changing an overall bitrate setting or an overall bitrate limit. The inventors recognized that the bandwidth extension bit load may be another efficient mean to adapt a normal encoding functionality to a modified encoding functionality, in order to save bits and still provide decoder configuration information or to set the decoder in a desired state (e.g. without changing a configuration thereof), as explained before.

According to further embodiments of the invention, the audio encoder is configured to use a modified encoding functionality, in which a spectral band replication, SBR, bit load, e.g. a bit load for controlling a spectral bandwidth replication, is reduced, e.g. when compared to the case of the normal encoding functionality, e.g. while still complying with the minimum requirements of the spectral band replication specification, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. The inventors recognized that an amount of bits needed for the representation of the preceding audio frames may be reduced with limited or even without impact on the information for the configuration of a respective decoder by reducing the SBR bit load. In addition, as an example, this may allow to set the decoder in a desired state (e.g. without changing a configuration thereof).

According to further embodiments of the invention, the audio encoder is configured to use a modified encoding functionality, in which a plurality of spectral band replication, SBR, parameters are set to a predetermined, e.g. fixed, value, e.g. to zero, which allows for a reduction or for a minimization of a number of bits required for an encoding of the spectral band replication parameters, e.g. when compared to the case of the normal encoding functionality, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. Hence, the inventors recognized that an information about spectral band replication parameters may be dropped, or approximated by the predefined value, without or with limited impact on the information provided by the representations of the one or more audio frames preceding the current audio frame to a respective decoder for the configuration of the respective decoder, e.g. in comparison to a normal encoding functionality, e.g. such that normally encoded frames can be decoded using a same configuration. However, the information provided by the representations of the one or more audio frames preceding the current audio frame may allow to set the respective decoder in a desired state, e.g. without changing a configuration thereof.

According to further embodiments of the invention, the audio encoder is configured to use a modified encoding functionality, in which a number of spectral band replication bands or a number of spectral band replication envelopes is reduced, e.g. down to 1, e.g. when compared to the case of the normal encoding functionality, in which, for example, a plurality of spectral band replication bands or a plurality of spectral band replication envelopes are used, e.g. in order to reduce or minimize a frequency resolution of the spectral band replication data, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. Hence, the inventors recognized that the number of spectral band replication bands or the number of spectral band replication envelopes may be reduced without or with limited impact on the information provided by the representations of the one or more audio frames preceding the current audio frame to a respective decoder for the configuration of the respective decoder, e.g. in comparison to a normal encoding functionality, e.g. such that normally encoded frames can be decoded using a same configuration. However, the information provided by the representations of the one or more audio frames preceding the current audio frame may allow to set the respective decoder in a desired state, e.g. without changing a configuration thereof.

According to further embodiments of the invention, the audio encoder is configured to use a modified encoding functionality, in which a frequency resolution of spectral band replication data, e.g. as contained in the UsacSbrData( ) syntax element, is reduced (e.g. when compared to the case of the normal encoding functionality, in which, for example, a plurality of spectral band replication bands or a plurality of spectral band replication envelopes are used, e.g. in order to reduce or minimize a frequency resolution of the spectral band replication data), for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. The inventors recognized that this may allow to reduce the size of the SBR payload, hence reducing a size of the representation of the preceding audio signal, while still allowing to provide a desired information for the configuration and/or for a desired state (e.g. without changing a configuration) of a respective decoder via the representations of the one or more audio frames preceding the current audio frame, e.g. such that normally encoded frames can be decoded using a same configuration.

According to further embodiments of the invention, the audio encoder is configured to use a modified encoding functionality, in which a bit load in a UsacSbrData( ) syntax element is reduced, e.g. when compared to the case of the normal encoding functionality, in which, for example, a plurality of spectral band replication bands or a plurality of spectral band replication envelopes are used, e.g. in order to reduce or minimize a frequency resolution of the spectral band replication data, for providing the representations of the one or more audio frames preceding the current audio frame, which are included into the immediate playout frame, e.g. while keeping other encoding parameters unchanged, to thereby avoid the need for a decoder re-initialization, e.g. without changing an overall bitrate setting or an overall bitrate limit, while keeping spectral band replication parameters which are part of an usacConfig( ) syntax element and/or of a SbrConfig( ) syntax element unchanged, e.g. when compared to an encoding of the current audio frame. As explained before, the inventors recognized that using the modified encoding functionality, information may be categorized into information directly relevant for a desired decoder configuration and/or desired state (e.g. without changing a configuration of the decoder), and information that may be dropped or simplified for the decoding, hence allowing to reduce an amount of bits needed for the representation of the preceding audio frames.

According to further embodiments of the invention, the audio encoder is configured to use a modified encoding functionality, in which a multi-channel encoding bit load (e.g. a bit load for a parametric multi-channel encoding, like a MPEG-surround encoding; e.g. a bit load for encoding inter-channel level difference parameters and/or inter-channel correlation parameters, and/or inter-channel-coherence parameters, and/or inter-channel-time-difference parameters, and/or inter-channel phase-difference parameters, or a bit load for encoding a difference signal for encoding a difference between two or more channels, or a bit load for encoding a residual signal supporting the parametric multi-channel encoding) is reduced, e.g. when compared to the case of the normal encoding functionality, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. The inventors recognized that a reduction of the multi-channel encoding bit load may provide an efficient possibility to reduce an amount of bits needed for the representation of the preceding audio frames.

According to further embodiments of the invention, the audio encoder is configured to use a modified encoding functionality, in which a plurality of multi-channel encoding parameters (e.g. inter-channel level difference parameters and/or inter-channel correlation parameters, and/or inter-channel-coherence parameters, and/or inter-channel-time-difference parameters, and/or inter-channel phase-difference parameters) are set to a predetermined, e.g. fixed, value, e.g. to zero, which allows for a reduction or for a minimization of a number of bits required for an encoding of the multi-channel encoding parameters, e.g. when compared to the case of the normal encoding functionality, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. Hence, the inventors recognized that an information about multi-channel encoding parameters may be dropped, or approximated by the predefined value, without or with limited impact on the information provided by the representations of the one or more audio frames preceding the current audio frame to a respective decoder for the configuration of the respective decoder, e.g. in comparison to the normal encoding functionality, e.g. such that normally encoded frames can be decoded using a same configuration. However, the information provided by the representations of the one or more audio frames preceding the current audio frame may allow to set the respective decoder in a desired state, e.g. without changing a configuration thereof.

According to further embodiments of the invention, the audio encoder is configured to use a modified encoding functionality, in which a multi-channel encoding remains activated, e.g. in the sense that multi-channel parameters are actually included into the bitstream; e.g. in order to avoid a change of a decoder configuration, and in which differences between two or more channels remain unconsidered in the provision of the multi-channel encoding parameters, e.g. in that standard multi-channel encoding parameters are provided which can be encoded with a small bit effort and which do not reflect differences between actual input signals, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. Hence, the inventors recognized that the multi-channel encoding parameters may, for example, be set to same values, or to default values, which can be encoded with a low amount of bits, and without or with limited impact on the information provided to a respective decoder for the configuration of the decoder, e.g. in comparison to the normal encoding functionality, e.g. such that normally encoded frames can be decoded using a same configuration. However, the information provided by the representations of the one or more audio frames preceding the current audio frame may allow to set the respective decoder in a desired state, e.g. without changing a configuration thereof.

According to further embodiments of the invention, the audio encoder is configured to use a modified encoding functionality, in which a transform-coded excitation, TCX, linear-prediction domain encoding, e.g. with a coarse quantization, coarser than a quantization that would be used in the normal encoding functionality for the encoding of TCX data, is used instead of an ACELP linear predication domain encoding, which would, for example, be used in the normal encoding functionality, or which has been used in the normal encoding functionality, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. The inventors recognized that using the transform-coded excitation may allow to reduce the amount of bits needed for the representation of the preceding audio frames compared to an encoding based on the ACELP.

According to further embodiments of the invention, the audio encoder is configured to use a modified encoding functionality, in which a transform-coded excitation, TCX, linear-prediction domain encoding with a coarser quantization, e.g. coarser than a quantization that would be used in the normal encoding functionality for the encoding of TCX data, is used instead of a transform-coded excitation, TCX, linear-prediction domain encoding with a finer quantization, which would be used in the normal encoding functionality, or which has been used in the normal encoding functionality, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. Again, this may allow to reduce the amount of bits needed for the representation of the preceding audio frames.

According to further embodiments of the invention, the audio encoder is configured to use a modified encoding functionality, in which a time domain resolution, e.g. a time domain resolution in the linear prediction encoding, and/or a time domain resolution in a frequency domain encoding, is reduced (e.g. when compared to a normal encoding functionality, e.g. by avoiding a switching to a shortened TCX window, or by avoiding a usage of an "EIGHT_SHORT" window), for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. The inventors recognized that a quantization granularity in time domain may be reduced, while still allowing to encode an information in the representations of the preceding audio frames allowing to configure a respective decoder or to set a respective decoder in a desired state (e.g. without changing a configuration of the decoder), e.g. such that normally encoded frames can be decoded using a same configuration.

According to further embodiments of the invention, the audio encoder is configured to use a modified encoding functionality, in which a usage of multiple TCX windows within a single audio frame is avoided, e.g. blocked, for providing the representations of the one or more audio frames preceding the current audio frame, which are included into the immediate playout frame, e.g. while keeping other encoding parameters unchanged, to thereby avoid the need for a decoder re-initialization, e.g. without changing an overall bitrate setting or an overall bitrate limit.

According to further embodiments of the invention, the audio encoder is configured to use a modified encoding functionality, in which a single long TCX window is used instead of 2 medium sized TCX windows, and/or in which a single long TCX window is used instead of 4 short TCX windows, or in which a single long TCX window is used instead of a plurality of shorted TCX windows, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. In general, the inventors recognized that a reduction of the number of TCX windows used may reduce the amount of bits needed for the representation of the preceding audio frames, while still allowing to incorporate an information in a respective representation of a preceding audio frame for a desired configuration of a respective decoder and/or for a respective desired state of the decoder (e.g. without changing a configuration thereof), e.g. such that normally encoded frames can be decoded as well.

According to further embodiments of the invention, the audio encoder is configured to use a modified encoding functionality, in which a usage of a plurality of short MDCT transform windows, e.g. a usage of 8 short windows, within a single audio frame is avoided, e.g. blocked, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit.

According to further embodiments of the invention, the audio encoder is configured to use a modified encoding functionality, in which a single long MDCT transform window (e.g. a "START_STOP" window; e.g. a window having a left sided transition slope like a short MDCT transform window, and a right sided transition slope like a short MDCT transform length, and a window length longer, e.g. by a factor of at least 2, than a short MDCT transform window) is used instead a plurality of shorter MDCT transform windows, e.g. instead of an "EIGHT_SHORT" MDCT transform window, e.g. for a provision of MDCT coefficients of a frame, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. The inventors recognized that a reduction of the number of MDCT transform windows used, may allow to reduce the amount of bits needed for the encoded representation of the preceding audio frames, while still allowing to incorporate an information in a respective representation of a preceding audio frame for a desired configuration of a respective decoder and/or for a respective desired state of the decoder (e.g. without changing a configuration thereof), e.g. such that normally encoded frames can be decoded as well.

According to further embodiments of the invention, the audio encoder is configured to use a modified encoding functionality, in which a "START_STOP" MDCT transform window (e.g. a window having a left sided transition slope like an "EIGHT_SHORT" MDCT transform window, and a right sided transition slope like an "EIGHT_SHORT" MDCT transform window, and a window length longer, e.g. by a factor of at least 2, than an individual short MDCT transform window, and a total window length equal to a total window length of an "EIGHT SHORT" MDCT transform window) is used instead an "EIGHT_SHORT" MDCT transform window, e.g. for a provision of MDCT coefficients of a frame, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit.

According to further embodiments of the invention, the audio encoder is configured to use a modified encoding functionality, in which a reduced ACELP excitation codebook size, which is, for example, signaled by the "acelp_core_mode" parameter, and which may, for example, result in a reduced number of bits for an encoding of an innovation codebook index representing an excitation, is used, e.g. when compared to an excitation codebook size that would be used, or that has been used, in the normal encoding functionality, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. The inventors recognized that a reduction of the ACELP excitation codebook size may allow to reduce the amount of bits needed for the encoded representation of the preceding audio frames while still allowing to provide a sufficient information in a respective representation of a preceding audio frame, in order to properly configure a respective decoder, and/or in order to set a respective decoder in a desired state (e.g. without changing a configuration thereof), e.g. such that normally encoded frames can be decoded as well.

According to further embodiments of the invention, the audio encoder is configured to use a modified encoding functionality, in which a reduced number of bits is used for an encoding of an innovation codebook index representing an ACELP excitation, e.g. when compared to a number of bits that would be used, or that has been used, in the normal encoding functionality, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit.

According to further embodiments of the invention, the audio encoder is configured to use a modified encoding functionality, in which a modified ACELP mode, e.g. signaled by a different "acelp_core_mode" index, is used, e.g. when compared to an ACELP mode that would be used, or that has been used, in the normal encoding functionality, for providing the representations of the one or more audio frames preceding the current audio frame, which may be included into the immediate playout frame, e.g. while keeping other encoding parameters unchanged, to thereby avoid the need for a decoder re-initialization, e.g. without changing an overall bitrate setting or an overall bitrate limit. The inventors recognized that a modification of an ACELP mode may allow to reduce an amount of bits needed for the encoded representation of the preceding audio frames, while still allowing to provide an information in a respective representation of a preceding audio frame, that allows to configure a respective decoder, and/or to set a respective decoder in a desired state (e.g. without changing a configuration thereof), e.g. such that normally encoded frames can be decoded using the same configuration.

According to further embodiments of the invention, the audio encoder is configured to provide a USAC-compatible bitstream, e.g a bitstream in accordance with a current USAC specification in force at the day of filing of the application or at the priority date of this document, or wherein the audio encoder is configured to provide a MPEG-H 3D Audio compatible bitstream, e.g a bitstream in accordance with a current MPEG-H 3D Audio specification in force at the day of filing of the application or at the priority date of this document. The inventors recognized that the inventive encoder may be used particularly efficiently for providing a USAC-compatible bitstream, or a MPEG-H 3D Audio compatible bitstream.

According to further embodiments of the invention, the audio encoder is configured to also encode the one or more audio frames preceding the current audio frame in the normal encoding mode, in order to obtain one or more non-immediate playout frames, e.g. normal encoded audio frames which do not comprise an immediate playout overhead information, preceding the immediate playout frame. Hence, the encoder may, for example, comprise a plurality of encoding modes or encoding functionalities and may be configured in order switch, for example from a normal or default encoding functionality, to the modified encoding functionality, e.g. by adapting the normal encoding functionality, in order to provide the one or more immediate playout frames.

According to further embodiments of the invention, the audio encoder is configured to re-use intermediate encoding results, e.g. spectral values before quantization, and/or a subset of bandwidth extension parameters, and/or a subset of multichannel encoding parameters, of an encoding of the one or more frames preceding the current frame using the normal encoding functionality, in order to determine the bitrate reduced encoded representation of the one or more frames preceding the current frame which is the result of the modified encoding functionality, such that, for example, the modified encoding functionality uses spectral values obtained by the previously applied normal encoding functionality, but applies a different quantization or performs a re-quantization. This may allow to reduce the computational effort needed for providing the representation of the one or more frames preceding the current frame.

According to further embodiments of the invention, the audio encoder is configured to implement the normal encoding functionality using a first core coder instance, and to implement the modified encoding functionality using a second core coder instance, wherein, for example, the second core coder instance may be executed with a different setting when compared to the first core coder instance; and/or wherein the second core coder instance may be executed in parallel with the first core coder instance.

The inventors recognized that an encoder structure comprising two cores coder instances may allow to provide the different encoding functionalities, e.g. normal and modified, efficiently. As an example, the first core coder instance may provide a normally encoded Access Unit representation, and the second core coder instance may provide a corresponding Access Unit representation, that was encoded with the modified encoding functionality. The audio encoder may be configured to provide combined encoded signals based on the respective Access Unit representations of the first and second core coder instance, e.g. by selectively combining audio frame representations, e.g. by replacing representations of preceding Access Units of a current Access Unit that were normally encoded with representations thereof that were encoded in the modified manner.

According to further embodiments of the invention, the second core coder instance is configured to provide the representations of the one or more audio frames preceding the current audio frame, which may be included into the immediate playout frame, such that the representations of the one or more audio frames preceding the current audio frame, which may be included into the immediate playout frame, e.g. each, comprise a smaller number of bits than the representation of the current audio frame which is provided by the first core coder instance, wherein, for example, a number of bits of a representation of an audio frame preceding the current audio frame, which may be included into the immediate playout frame, may be smaller, for example, by at least 30 percent, or by at least 50 percent, or by at least 70 percent, than a number of bits of the representation of the current frame.

As a remark, it should be noted that, for example, the previous (pre-roll-) frames in the IPF, which come from (or which are obtained using) the second parallel core or which are obtained using the modified encoding functionality, may be smaller than the corresponding previous frames before the IPF, which come from (or which are obtained using) the first normal core or which are obtained using the normal encoding functionality.

Hence, an IPF may comprise a representation of a current audio frame, which was encoded normally, and one or more representations of preceding audio frames that were encoded in the modified manner. This may allow to provide the IPF efficiently.

In general, it is to be noted that optionally an IPF may comprise more than one representation of preceding audio frame.

Further embodiments according to the invention comprise a method for providing an encoded representation of an audio information on the basis of an input audio information, wherein the method comprises encoding a sequence of audio frames, e.g. in such a manner that a decoding of a given audio frame uses information, e.g. buffer states, obtained on the basis of one or more preceding audio frames, wherein the audio frames may be considered as access units, AU.

The method further comprises providing one or more immediate playout frames, e.g. designated as IPFs, comprising an optionally encoded representation of a current, e.g.

currently encoded, audio frame, or for example access unit AU, and encoded representations of one or more audio frames, or for example access units, preceding the current audio frame, wherein the encoded representations of one or more audio frames preceding the current audio frame may be considered as an audio pre-roll.

It should also be noted that in addition to the representation of the current frame and the representations of the one or more previous frames (Pre-Rolls), a decoder configuration (or decoder config) may be a specific part of the IPF; advantageously, the decoder config may be transferred exactly one time in the IPF, as a part of the audio pre-roll extension element.

Furthermore, the method comprises providing the representation of the current frame and the representations of the one or more audio frames preceding the current audio frame, which may be included into the immediate playout frame, such that the representation of the current frame and the representations of the one or more audio frames preceding the current audio frame are decodable using a same decoder configuration, e.g. such that there is no need for a decoder-re-initialization between the decoding of the representations of the one or more frames preceding the current frame and the decoding of the representation of the current frame.

In addition, the method comprises providing the representations of the one or more audio frames preceding the current audio frame, which are included into the immediate playout frame, using a modified encoding functionality (e.g. using a modified encoder bitrate setting, or using a modified encoder quantization setting, or using a modified masking threshold of a psychoacoustic model, or using a reduction of a spectral band replication (SBR) payload, or using a reduction of a multichannel (e.g. stereo coding) payload, using a replacement of an ACELP encoding by a TCX encoding with coarse quantization, or using a modified acelp_core_mode parameter, or using a deactivation of a switching to an increased temporal resolution), which is adapted to encode an audio frame using a smaller number of bits than a normal encoding functionality which is used for the encoding of the current audio frame.

The method as described above is based on the same considerations as the above-described audio encoder. The method can, by the way, be completed with all features and functionalities, which are also described with regard to the audio encoder.

Further embodiments according to the invention comprise a computer program for performing a method according to the invention, when the computer program runs on a computer.

Further embodiments according to the invention comprise an encoded audio representation, wherein the encoded audio representation comprises a sequence of encoded audio frames, e.g. in such a manner that a decoding of a given audio frame uses information, e.g. buffer states, obtained on the basis of one or more preceding audio frames, wherein the audio frames may be considered as access units AU.

Furthermore, the encoded audio representation comprises one or more immediate playout frames, e.g. designated as IPFs, comprising an optionally encoded, representation of a current, e.g. currently encoded, audio frame, or for example access unit AU, and encoded representations of one or more audio frames, or for example access units, preceding the current audio frame, wherein the encoded representations of one or more audio frames preceding the current audio frame may be considered as an audio pre-roll.

It should also be noted that in addition to the representation of the current frame and the representations of the one or more previous frames (Pre-Rolls), a decoder configuration (or decoder config) may be a specific part of the IPF; advantageously, the decoder config may be transferred exactly one time in the IPF, as a part of the audio pre-roll extension element.

Moreover, the representation of the current frame, which may be included in the IPF, and the representations of the one or more audio frames preceding the current audio frame, which may also be included in the IPF, are decodable using a same decoder configuration, e.g. such that there is no need for a decoder-re-initialization between the decoding of the representations of the one or more frames preceding the current frame and the decoding of the representation of the current frame.

In addition, the representations of the one or more audio frames preceding the current audio frame, which are included into the immediate playout frame, are provided using a modified encoding functionality, (e.g. using a modified encoder bitrate setting, or using a modified encoder quantization setting, or using a modified masking threshold of a psychoacoustic model, or using a reduction of a spectral band replication (SBR) payload, or using a reduction of a multichannel (e.g. stereo coding) payload, using a replacement of an ACELP encoding by a TCX encoding with coarse quantization, or using a modified acelp_core_mode parameter, or using a deactivation of a switching to an increased temporal resolution) which is adapted to encode an audio frame using a smaller number of bits than a normal encoding functionality which is used for the encoding of the current audio frame.

Further embodiments according to the invention comprise an encoded audio representation, wherein the encoded audio representation comprises a sequence of encoded audio frames, e.g. in such a manner that a decoding of a given audio frame uses information, e.g. buffer states, obtained on the basis of one or more preceding audio frames, wherein the audio frames may be considered as access units AU.

Furthermore, the encoded audio representation comprises one or more immediate playout frames, e.g. designated as IPFs, comprising an optionally encoded representation of a current, e.g. currently encoded, audio frame, or for example access unit AU, and encoded representations of one or more audio frames, or for example access units, preceding the current audio frame, wherein the encoded representations of one or more audio frames preceding the current audio frame may be considered as an audio pre-roll.

It should also be noted that in addition to the representation of the current frame and the representations of the one or more previous frames (Pre-Rolls), a decoder configuration (or decoder config) may be a specific part of the IPF; advantageously, the decoder config may be transferred exactly one time in the IPF, as a part of the audio pre-roll extension element.

In addition, the representation of the current frame, which may be included in the IPF, and the representations of the one or more audio frames preceding the current audio frame, which may also be included in the IPF, are decodable using a same decoder configuration, e.g. such that there is no need for a decoder-re-initialization between the decoding of the representations of the one or more frames preceding the current frame and the decoding of the representation of the current frame.

Moreover, the encoded representations of the one or more audio frames preceding the current audio frame, which are included into the immediate playout frame, e.g. each comprise a smaller number of bits than the encoded representation of the current frame.

Optionally, as an example, a number of bits of an encoded representation of an audio frame preceding the current audio frame may be smaller, for example, by at least 30 percent, or by at least 50 percent, or by at least 70 percent, than a number of bits of the encoded representation of the current frame.

As a remark, it should be noted that, for example, the previous (pre-roll-) frames in the IPF, which come from (or which are obtained using) the second parallel core or which are obtained using the modified encoding functionality, are smaller than the corresponding previous frames before the IPF, which come from (or which are obtained using) the first normal core or which are obtained using the normal encoding functionality.

The encoded audio representations as described above are based on the same considerations as the above-described audio encoder. The encoded audio representation can, by the way, be completed with all features and functionalities, which are also described with regard to the audio encoder.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
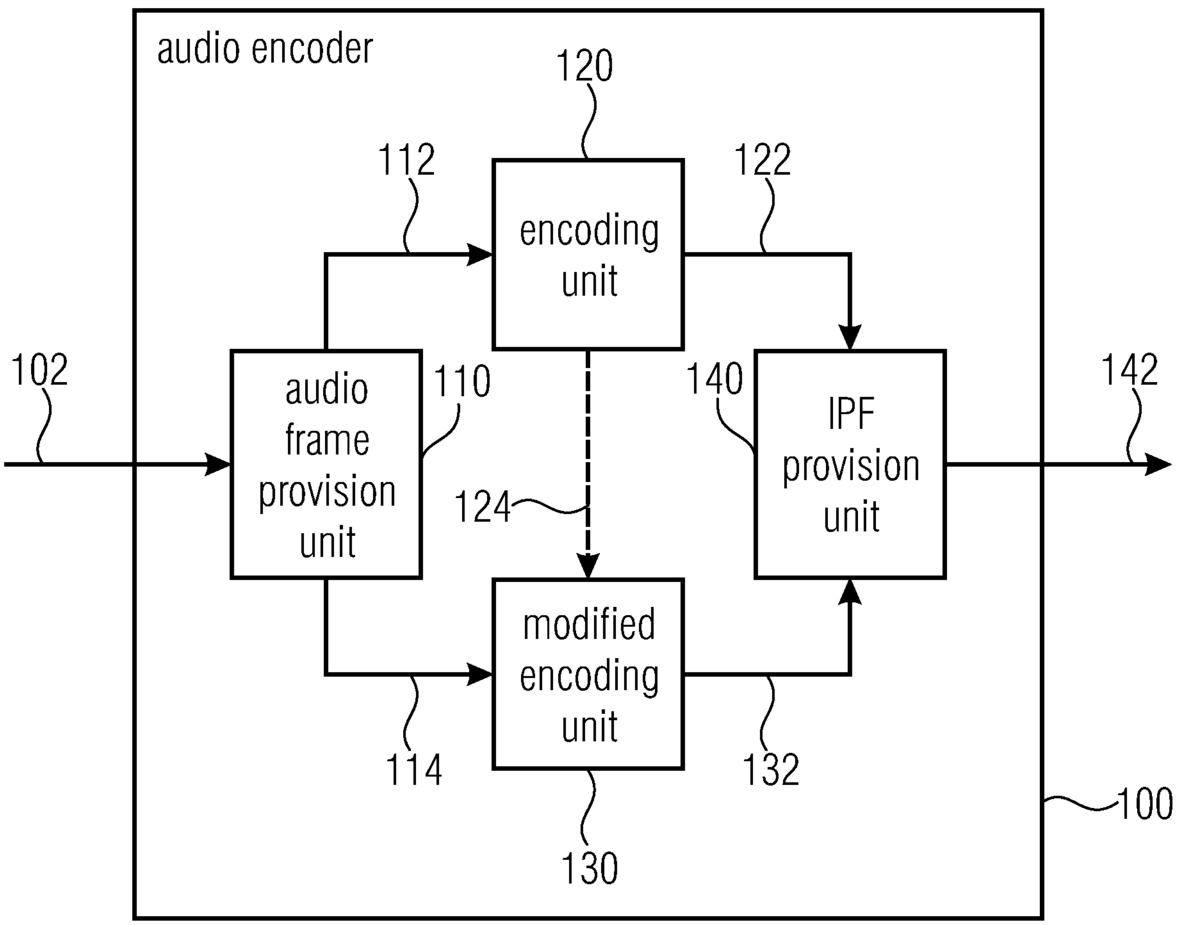
FIG. 1 shows a block diagram of a method for providing an electrical connection according to an embodiment of the present invention.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

FIG. 1 shows a schematic side view of an audio encoder according to embodiments of the invention. FIG. 1 shows audio encoder 100 comprising an audio frame provision unit 110, an encoding unit 120, a modified encoding unit 130 and an immediate playout frame, IPF, provision unit 140.

Encoder 100 is provided with an input signal 102. The input signal 102 may, for example, comprise an input audio information and/or one or more audio frames or access units. Optionally, the audio frame provision unit 110 may be configured to process signal 102 in order to provide one or more audio frames.

Audio frame provision unit 110 is configured to provide an audio frame 112 that is to be encoded, e.g. to be currently encoded, to encoding unit 120. Optionally, audio frame provision unit 110 may be configured to provide an audio frame 112 that is to be encoded, e.g. to be currently encoded, and one or more audio frames preceding the e.g. current audio frame, e.g. one or more audio frames that were encoded previous to the e.g. current audio frame, to encoding unit 120.

Furthermore, audio frame provision unit 110 is configured to provide one or more audio frames 114 preceding the, e.g. current, audio frame, e.g. one or more audio frames that were encoded previous to the, e.g. current, audio frame, to modified encoding unit 130. Optionally, the audio frame provision unit 110 may be configured to provide the audio frame that is to be encoded, e.g. to be currently encoded, to modified encoding unit 130 in addition.

Encoding unit 120 is configured to encode the e.g. current audio frame. In the following this encoding functionality may be referred to as "normal" encoding. If being provided with preceding audio frames, encoding unit 120 may optionally encode the preceding audio frames as well. Hence, signal 122 comprises an encoded representation of the current frame and optionally an encoded representation of the one or more audio frames preceding the current audio frame. Optionally, encoding unit 120 may be configured to provide an IPF comprising "normally" encoded representations of the current frame and of the one or more audio frames preceding the current audio frame. Signal 122 may optionally comprise a bitstream of normally encoded audio frames or access units.

Modified encoding unit 130 is configured to encode the one or more audio frames preceding the, e.g. current, audio frame, in order to provide an encoded representation of the one or more audio frames preceding the current audio frame, wherein the one or more audio frames preceding the current audio frame are encoded in a modified manner, using a smaller number of bits in comparison to the encoding functionality which is performed by encoding unit 120.

Optionally, modified encoding unit 130 may be configured to encode, if provided with, the current audio frame in the modified manner as well and may, for example hence, provide an IPF encoded in the modified manner, comprising the representations of the current frame and of the one or more audio frames preceding the current audio frame that were encoded using the modified encoding functionality. Signal 132 may optionally comprise a bitstream of encoded audio frames or access units, encoded in the modified manner.

Hence, signal 122 may, for example, be a "normally" encoded representation of the, e.g. current, audio frame and signal 132 may, for example, be the representation of the one or more audio frames preceding the current audio frame that was encoded in the modified manner.

As explained before, optionally, signal 122 may as well comprise a "normally" encoded representation of the one or more audio frames preceding the current audio frame or may comprise an IPF comprising the "normally" encoded representations of the current frame and of the one or more audio frames preceding the current audio frame.

Accordingly, optionally, signal 132 may as well comprise a representation of the current audio frame in the modified manner and/or may, for example, comprise an IPF encoded in the modified manner, comprising the representations of the current frame and of the one or more audio frames preceding the current audio frame that were encoded using the modified encoding functionality.

Hence, encoding unit 120 and modified encoding unit 130 may form an encoding structure of audio encoder 100 which is configured to encode a sequence of audio frames, provided by the audio frame provision unit 110.

It is to be noted that signals 122 and 132 may be decoded using a same decoder configuration. Hence, the modification of the encoding functionality of modified encoding unit 130 in contrast to encoding unit 120 may be implemented, such that the modified encoding only affects portions of the encoded data that do not have an impact on a configuration of a respective decoder (e.g. in comparison to a "normal" decoding thereof), for example, such that there is no need for a decoder-re-initialization between the decoding of the representations of the one or more frames preceding the current frame and the decoding of the representation of the current frame. On the other hand, based on the data encoded in the modified manner, a respective decoder may, for example, be set in a desired state, that may be identical to a state that would be achieved upon receiving the respective data encoded in a normal manner, e.g. without changing a configuration of the decoder.

IPF provision unit 140 is configured to provide one or more immediate playout frames 142 comprising the "normally" encoded representation of a current audio frame and representations of one or more audio frames preceding the current audio frame that were encoded in the modified manner.

Optionally, for example, in a case wherein signal 122 comprises additionally, the representation of the preceding audio frames and/or wherein signal 132 comprises additionally the representation of the e.g. current audio frame, IPF provision unit 140 may be configured to replace the representations of the preceding audio frames that were "normally" encoded in signal 122 with the representations of the preceding audio frames that were encoded in the modified manner from signal 132 in order to provide the one or more immediate playout frames 142 comprising the "normally" encoded representation of a current audio frame and representations of one or more audio frames preceding the current audio frame that were encoded in the modified manner. Optionally, signal 142 may comprise a bitstream of audio frames, e.g. of a plurality of normally encoded audio frames or access units together with IPFs comprising normally encoded currently encoded frames and preceding frames encoded in the modified manner.

Hence, optionally, the audio encoder 100 may be configured to also encode the one or more audio frames preceding the current audio frame in the normal encoding mode, e.g. using unit 120, in order to obtain one or more non-immediate playout frames, e.g. as a part of signal 142, e.g. normally encoded audio frames which do not comprise an immediate playout overhead information, preceding the immediate playout frame.

Optionally, the modified encoding unit 130 may be configured to provide a similar encoding functionality as the encoding unit 120, for example with a modified bitrate setting or bitrate limit. As an example, a bitrate setting or a bitrate limit may be reduced when compared to the "normal" encoding functionality of encoding unit 120. Hence, signal 132, e.g. the representations of the one or more audio frames preceding the current audio frame may be provided based on a reduced bitrate setting or bitrate limit.

Optionally, according to embodiments, the bitrate setting or bitrate limit may be used for deciding how many bits are allocated to an encoding of different spectral values.

Consequently, as an example, the reduced bitrate setting or the reduced bitrate limit may result in a coarser quantization of one or more parameters. Hence, the preceding audio frames may be encoded more coarsely by modified encoding unit 130 than they would be encoded by encoding unit 120.

Accordingly, as an example, the reduced bitrate setting or the reduced bitrate limit may results in a smaller core bandwidth.

As another optional feature, the modified encoding unit 130 may be configured to provide encoded representations differing from encoded representations of encoding unit 120 in that only encoding parameters are changed which do not result in a change of a decoder configuration. Hence, encoding parameters, a change of which would result in a change of a decoder configuration, may be left unchanged between audio frames encoded in unit 120 compared to audio frames encoded in unit 130.

As another optional feature, modified encoding unit 130 may use a reduced a number of bits available for a quantization or for an encoding of one or more parameters when compared to "normal" encoding functionality of unit 120. The parameters may, for example, be spectral values, or quantized spectral values, or SBR parameters or quantized SBR parameters.

As another optional feature, the modified encoding unit 130 may be configured to reduce or limit a quantization accuracy of individual parameters or of groups or parameters in contrast to an encoding functionality of unit 120. In other words, the modified encoding unit 130 may be configured to encode audio frames more coarsely than encoding unit 120. The inventors recognized that this may allow to save bits, e.g. for an audio Pre-roll, while still allowing to decode the respective audio frames using a same decoder configuration as for encoded audio frames that were encoded using unit 120.

Furthermore, the inventors recognized that a coarser quantization using unit 130 for the one or more audio frames preceding the e.g. current audio frame, e.g. compared to a respective quantization using unit 120, may be advantageously applied to a MDCT spectrum. As explained before, bits may be saved, while still allowing to provide an information in the IPF for configuring a respective decoder and/or to set the respective decoder in a desired state (e.g. without changing a configuration thereof), such that a same decoder configuration may be set, as if the audio frames were encoded using unit 120 or in other words using the "normal" encoding functionality.

In accord with the above explanations, optionally, modified encoding unit 130 and encoding unit 120 may be configured to provide a similar or a same, or even an identical encoding functionality, except for the usage of a coarser quantization, such that some or even all other parameters that were not encoded more coarsely may be similar, or the same or even identical.

As another optional feature, modified encoding unit 130 may be configured to encode a spectrum, e.g. an MDCT spectrum, e.g. coefficients representing such a spectrum, with a reduced maximum number of bits for the quantization thereof, compared to the "normal" encoding functionality. Hence, a need of bits at least for the audio frames preceding the e.g. current audio frame may be reduced.

As another optional feature, the modified encoding unit 130 may be configured to perform an iterative quantization. As an example, a bit-constraint, e.g. a maximum number of bits, may be provided to the modified encoding unit 130, which may quantize and re-quantize the spectrum with varying, e.g. increasing step size, or with decreasing granularity, until the bit constrained is fulfilled.

As another optional feature, the modified encoding unit 130 and the "normal" encoding unit 120 may be configured to provide a similar or a same or an identical encoding functionality, e.g. except for the usage of a global gain parameters, such that the difference in the global gain parameters may cause a coarser quantization for data encoded using the modified encoding unit 130 in contrast to data encoded using encoding unit 120. However the gain parameters may as well be only one of the differences between the "normal" and the modified encoding functionality. The inventors recognized that an adaptation of such a gain parameters may allow to adapt a quantization step size.

In general, it is to be noted that FIG. 1 shows an example, comprising two distinct encoding units 120 and 130. However, embodiments may comprise only a single encoding unit, wherein the audio encoder may be configured to adapt or switch or change encoding parameters or settings, e.g. as explained above a global gain parameter, in order to switch from a "normal" encoding functionality of the single encoding unit to the modified encoding functionality and vice versa.

Thus, embodiments may comprise an audio encoder 100 configured to implement the normal encoding functionality using a first core coder instance, e.g. the encoding unit 120, and to implement the modified encoding functionality using a second core coder instance, e.g. the modified encoding unit 130, wherein, for example, the second core coder instance may be executed with a different setting when compared to the first core coder instance; and/or wherein the second core coder instance may be executed in parallel with the first core coder instance.

Accordingly, as an optional feature, the modified encoding unit 130 may be configured to encode the one or more audio frames preceding the current audio frame such that the representations of the one or more audio frames preceding the current audio frame comprise a smaller number of bits then the representation of the current audio frame which is provided by the encoding unit 120. In other words, the second core coder instance may be configured to provide the representations of the one or more audio frames preceding the current audio frame, which are included into the immediate playout frame 142, such that the representations of the one or more audio frames preceding the current audio frame, e.g. each, comprise a smaller number of bits than the representation of the current audio frame which is provided by the first core coder instance. In simple words, and as an example, if a same signal is provided to unit 120 and to unit 130, the encoded representation thereof provided by unit 130 may comprise less bits than the representation provided by unit 120, however they may both be decodable using a same decoder configuration.

As another optional feature, an encoding functionality of unit 120 and/or of unit 130 may be using or may be based on a masking threshold, wherein the masking threshold is or was obtained using a psychoacoustic model. In order to provide a coarser quantization for the one or more audio frames preceding the current audio frame, the modified encoding functionality of unit 130 may use a different or changed masking threshold than unit 120.

As another optional feature, the modified encoding unit 130 may use a reduced bandwidth extension bit load in comparison to encoding unit 120. However, it is to be noted that constraints regarding minimum requirements of the bandwidth extension specification may still be fulfilled. The inventors recognized that an adaptation of a bandwidth extension bit load for providing the modified encoding functionality for providing the representations of the one or more audio frames preceding the current audio frame may allow to control a spectral band replication, such that bits for the encoding of the one or more audio frames preceding the current audio frame may be saved, while allowing a decoding of such data with a same decoder configuration as data encoded with unit 120.

Accordingly, as an optional feature, a spectral band replication, SBR, bit load, e.g. a bit load for controlling a spectral bandwidth replication may be reduced for providing the representations of the one or more audio frames preceding the current audio frame using the modified encoding functionality in comparison to the "normal" encoding functionality.

As another optional feature, for the modified encoding functionality, a plurality of spectral band replication, SBR, parameters may be set to a predetermined, e.g. fixed, value, e.g. to zero. This may allow for a reduction or for a minimization, e.g. in comparison to the "normal" encoding functionality, of a number of bits required for an encoding of the spectral band replication parameters for providing the representations of the one or more audio frames preceding the current audio frame.

Furthermore, modified encoding unit 130 may, for example, be configured to use a reduced number of spectral band replication bands or a number of spectral band replication envelopes in comparison to "normal" encoding unit 120, at least for providing the representations of the one or more audio frames preceding the current audio frame. Optionally, only a single envelope may be used. Hence, a frequency resolution of the spectral band replication data may be reduced for the provision of the representations of the one or more audio frames preceding the current audio frame.

As another optional feature, modified encoding unit 130 may, for example, be configured to at least encode the one or more audio frames preceding the e.g. current audio frame, using a reduced frequency resolution of spectral band replication data in comparison to encoding unit 120.

As another optional feature, modified encoding unit 130 may, for example, be configured to use a reduced bit load in a UsacSbrData( ) syntax element (e.g. in comparison to unit 120), at least for providing the representations of the one or more audio frames preceding the current audio frame, while keeping spectral band replication parameters which are part of an usacConfig( ) syntax element and/or of a SbrConfig( ) syntax element unchanged. Hence, the inventors recognized that SBR payload content may be removed or reduced, in order to save bits, while still allowing a respective decoder to decode data encoded using the "normal" encoding functionality and the modified encoding functionality using a same decoder configuration.

As another optional feature, e.g. in comparison to unit 120, modified encoding unit 130 may use a reduced multi-channel encoding bit load, e.g. a bit load for a parametric multi-channel encoding, like a MPEG-surround encoding, for providing the representations of the one or more audio frames preceding the current audio frame. The bit load may, for example be a bit load for encoding inter-channel level difference parameters and/or inter-channel correlation parameters, and/or inter-channel-coherence parameters, and/or inter-channel-time-difference parameters, and/or inter-channel phase-difference parameters, or a bit load for encoding a difference signal for encoding a difference between two or more channels, or a bit load for encoding a residual signal supporting the parametric multi-channel encoding.

Optionally, using the modified encoding functionality, a plurality of multi-channel encoding parameters, may be set to a e.g. fixed, value, e.g. to zero. The multi-channel encoding parameters may, for example, be inter-channel level difference parameters and/or inter-channel correlation parameters, and/or inter-channel-coherence parameters, and/or inter-channel-time-difference parameters, and/or inter-channel phase-difference parameters. This may allow a reduction or a minimization of a number of bits required for an encoding of the multi-channel encoding parameters for providing the representations of the one or more audio frames preceding the current audio frame.

Optionally, modified encoding unit 130 may be configured to reduce an amount of bits used in a multi-channel encoding mode by approximating or even ignoring differences between two or more channels in the provision of the multi-channel encoding parameters for providing the representations of the one or more audio frames preceding the current audio frame. Hence, the inventors recognized that multi-channel parameters may actually be included into the bitstream, in order to avoid an unwanted change of a decoder configuration, wherein bits may be saved by not including bits used for indicating differences between actual input signals, and, for example, only including standard multi-channel encoding parameters, which can be encoded with a small bit effort. In other words, using the modified encoding functionality, a multi-channel encoding may remain activated and differences between two or more channels may remain unconsidered in the provision of the multi-channel encoding parameters, for providing the representations of the one or more audio frames preceding the current audio frame.

As another optional feature, modified encoding unit 130 may be configured to use a transform-coded excitation, TCX, linear-prediction domain encoding, e.g. with a coarse quantization, e.g. coarser than a quantization that would be used in the normal encoding functionality for the encoding of TCX data, e.g. instead of an ACELP linear predication domain encoding, e.g. as used by encoding unit 120, for providing the representations of the one or more audio frames preceding the current audio frame.

As another optional feature, modified encoding unit 130 may be configured to use a transform-coded excitation, TCX, linear-prediction domain encoding with a coarser quantization, e.g. coarser than a quantization that would be used in the normal encoding functionality for the encoding of TCX data, e.g. instead of a transform-coded excitation, TCX, linear-prediction domain encoding with a finer quantization, e.g. as used by unit 120, for providing the representations of the one or more audio frames preceding the current audio frame.

As another optional feature, modified encoding unit 130 may be configured to reduce a time domain resolution, e.g. a time domain resolution in the linear prediction encoding, and/or a time domain resolution in a frequency domain encoding, e.g. when compared to a normal encoding functionality, e.g. the encoding functionality as performed by unit 120.

As another optional feature, modified encoding unit 130 may be configured to avoid usage of multiple TCX windows within a single audio frame, for providing the representations of the one or more audio frames preceding the current audio frame. The inventors recognized that a reduced amount of TCX windows, e.g. in comparison to the "normal" encoding functionality, may allow to save bits without having to re-initialize a decoder for decoding "normally" encoded data and data encoded using the modified encoding functionality.

As another optional feature, modified encoding unit 130 may be configured to use a modified encoding functionality, in which a single long TCX window is used instead of 2 medium sized TCX windows, and/or in which a single long TCX window is used instead of 4 short TCX windows, or in which a single long TCX window is used instead of a plurality of shorted TCX windows, for providing the representations of the one or more audio frames preceding the current audio frame. Accordingly, encoding unit 120 may optionally be configured to use a plurality of TCX windows.

Accordingly, as an optional feature, modified encoding unit 130 may be configured to avoid usage of a plurality of short MDCT transform windows within a single audio frame, and/or the modified encoding unit 130 may be configured to use a single long MDCT transform window instead a plurality of shorter MDCT transform windows, for providing the representations of the one or more audio frames preceding the current audio frame.

Optionally, modified encoding unit 130 may be configured to use a "START_STOP" MDCT transform window, e.g. a window having a left sided transition slope like an "EIGHT_SHORT" MDCT transform window, and a right sided transition slope like an "EIGHT_SHORT" MDCT transform window, and a window length longer, e.g. by a factor of at least 2, than an individual short MDCT transform window, and a total window length equal to a total window length of an "EIGHT SHORT" MDCT transform window, instead of an "EIGHT_SHORT" MDCT transform window, e.g. for a provision of MDCT coefficients of a frame, e.g. as used by encoding unit 120, for providing the representations of the one or more audio frames preceding the current audio frame.

Hence, in general a modified encoding unit 130 may be configured to reduce a number of transform windows used in comparison to encoding unit 120. The inventors recognized that this may allow to reduce an amount of bits needed to represent the representation of the preceding audio frames, without leading to an unwanted alienation of a respective decoder configuration.

As another optional feature, modified encoding unit 130 may be configured to use a reduced ACELP excitation codebook size, which may, for example, be signaled by the "acelp_core_mode" parameter, and which may, for example, result in a reduced number of bits for an encoding of an innovation codebook index representing an excitation, for providing the representations of the one or more audio frames preceding the current audio frame, e.g. compared to encoding unit 120.

As another optional feature, modified encoding unit 130 may be configured to use a reduced number of bits for an encoding of an innovation codebook index representing an ACELP excitation, for providing the representations of the one or more audio frames preceding the current audio frame, e.g. compared to the "normal" encoding functionality.

As another optional feature, modified encoding unit 130 may be configured to use a modified encoding functionality, in which a modified ACELP mode, e.g. signaled by a different "acelp_core_mode" index, is used (e.g. when compared to an ACELP mode that would be used, or that has been used, in the normal encoding functionality, e.g. by unit 120) for providing the representations of the one or more audio frames preceding the current audio frame Optionally, audio encoder 100 may be configured to provide a USAC-compatible bitstream, e.g. a bitstream in accordance with a current USAC specification in force at the day of filing of the application or at the priority date of this document, or a MPEG-H 3D Audio compatible bitstream, e.g. a bitstream in accordance with a current MPEG-H 3D Audio specification in force at the priority date of this document or at the day of filing of the application.

As another optional feature, the audio encoder may be configured to re-use intermediate encoding results 124 of an encoding of the one or more frames preceding the current frame, using the normal encoding functionality, in order to determine the bitrate reduced encoded representation 132 of the one or more frames preceding the current frame, which is the result of the modified encoding functionality, such that, for example, the modified encoding functionality uses spectral values obtained by the previously applied normal encoding functionality, but applies a different quantization or performs a re-quantization. Intermediate encoding results 124 may, for example, be e.g. spectral values before quantization, and/or a subset of bandwidth extension parameters, and/or a subset of multichannel encoding parameters. Hence, a computational effort may be reduced or kept low.

Figure 2:
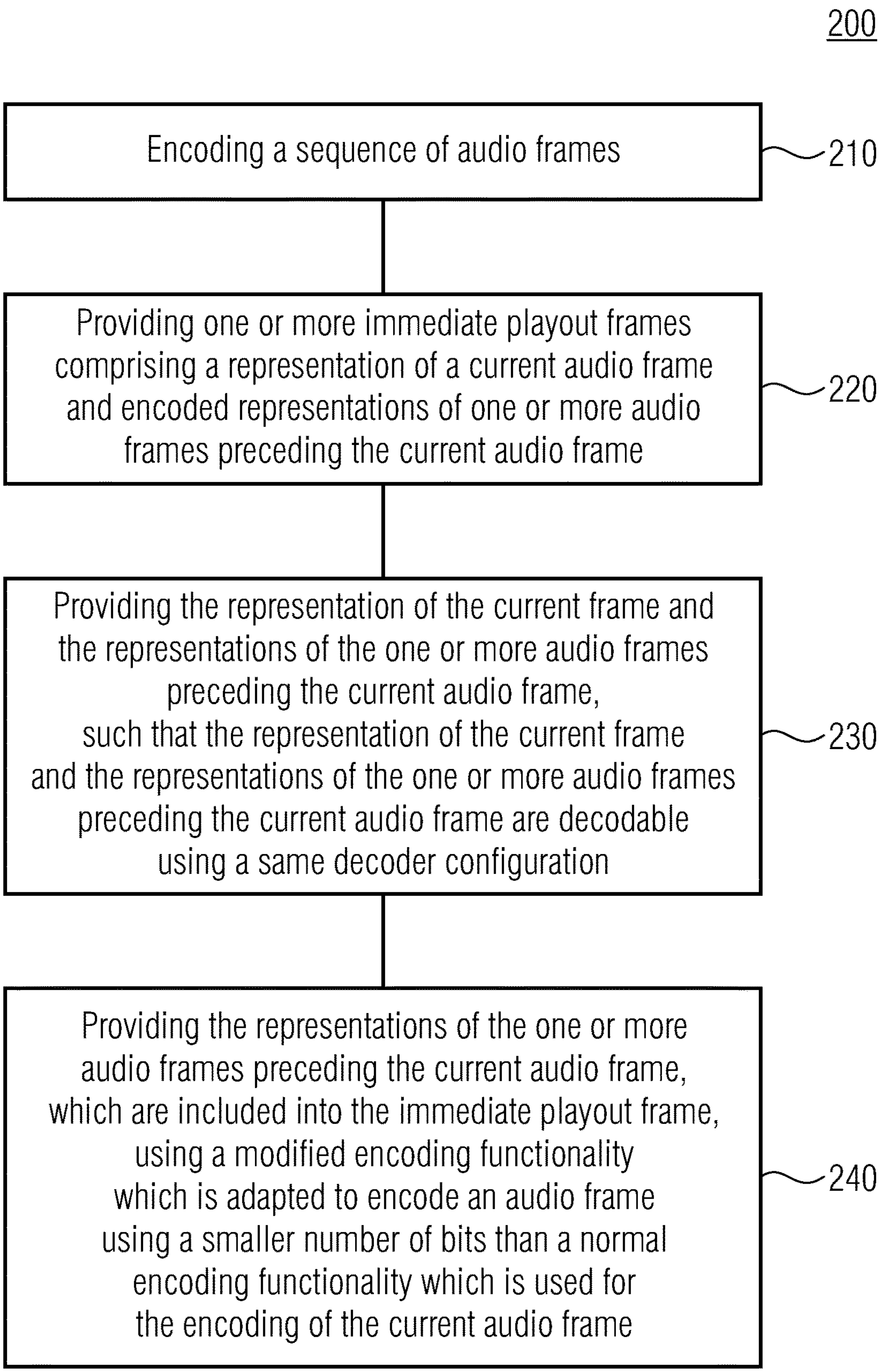
FIG. 2 shows a schematic block diagram of a method according to embodiments of the invention.

FIG. 2 shows a schematic block diagram of a method according to embodiments of the invention. Method 200 is a method for providing an encoded representation of an audio information on the basis of an input audio information. The method 200 comprises encoding 210 a sequence of audio frames, and providing 220 one or more immediate playout frames comprising a representation of a current audio frame and encoded representations of one or more audio frames preceding the current audio frame. The method further comprises providing 230 the representation of the current frame and the representations of the one or more audio frames preceding the current audio frame, such that the representation of the current frame and the representations of the one or more audio frames preceding the current audio frame are decodable using a same decoder configuration. In addition, the method comprises providing 240 the representations of the one or more audio frames preceding the current audio frame, which are included into the immediate playout frame, using a modified encoding functionality, which is adapted to encode an audio frame using a smaller number of bits than a normal encoding functionality which is used for the encoding of the current audio frame.

In the following further embodiments according to the invention will be disclosed.

Figure 4:
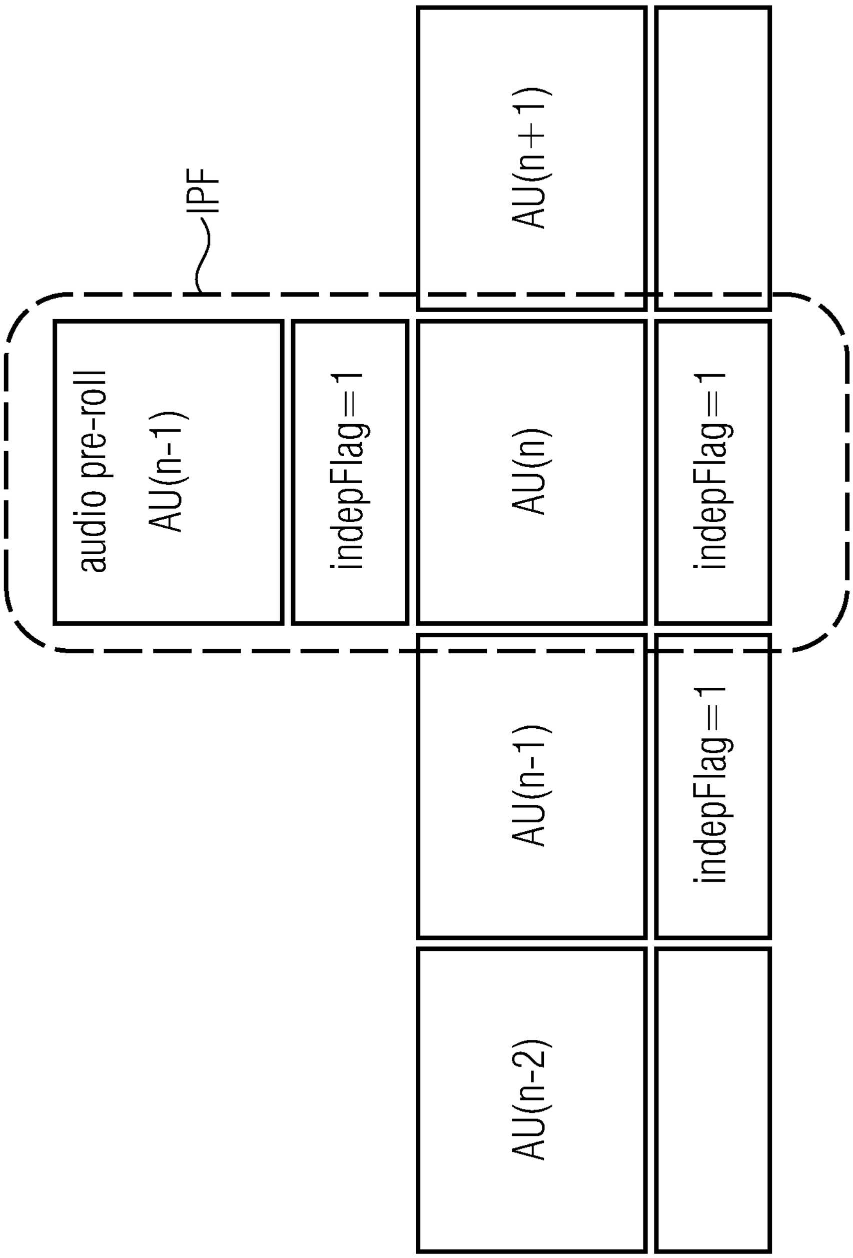
FIG. 4 shows a schematic visualization of a series of Access Units.

The following section may be titled solution, or solution according to embodiments of the invention: For example, to solve the existing problem, e.g. as discussed in the section "background of the invention", according to embodiments, it is proposed to reduce the size of the IPF, for example, by replacing the original Audio Pre-Roll frames, for example, by compressed versions thereof that are created, for example, by a second core encoder instance, e.g. unit 130, that runs, for example, in parallel to the already existing core encoder instance, e.g. unit 120. The current AU(n) (i.e. the part of the IPF containing the playout frame; see, for example, FIG. 4) shall, for example, stay untouched.

The parallel core encoder instance, e.g. unit 130, shall or may, for example, be configurable in various flexible ways to allow the creation of Audio Pre-Rolls that are, for example, smaller in size than the Audio Pre-Rolls of the original bit stream, while, for example, the basic properties of the IPF are kept (for example, Seamless Switching, etc.). These Audio Pre-Rolls are then, for example, taken to replace the Audio Pre-Roll of the original bit stream and such reduce the total size of the IPF.

Figure 3:
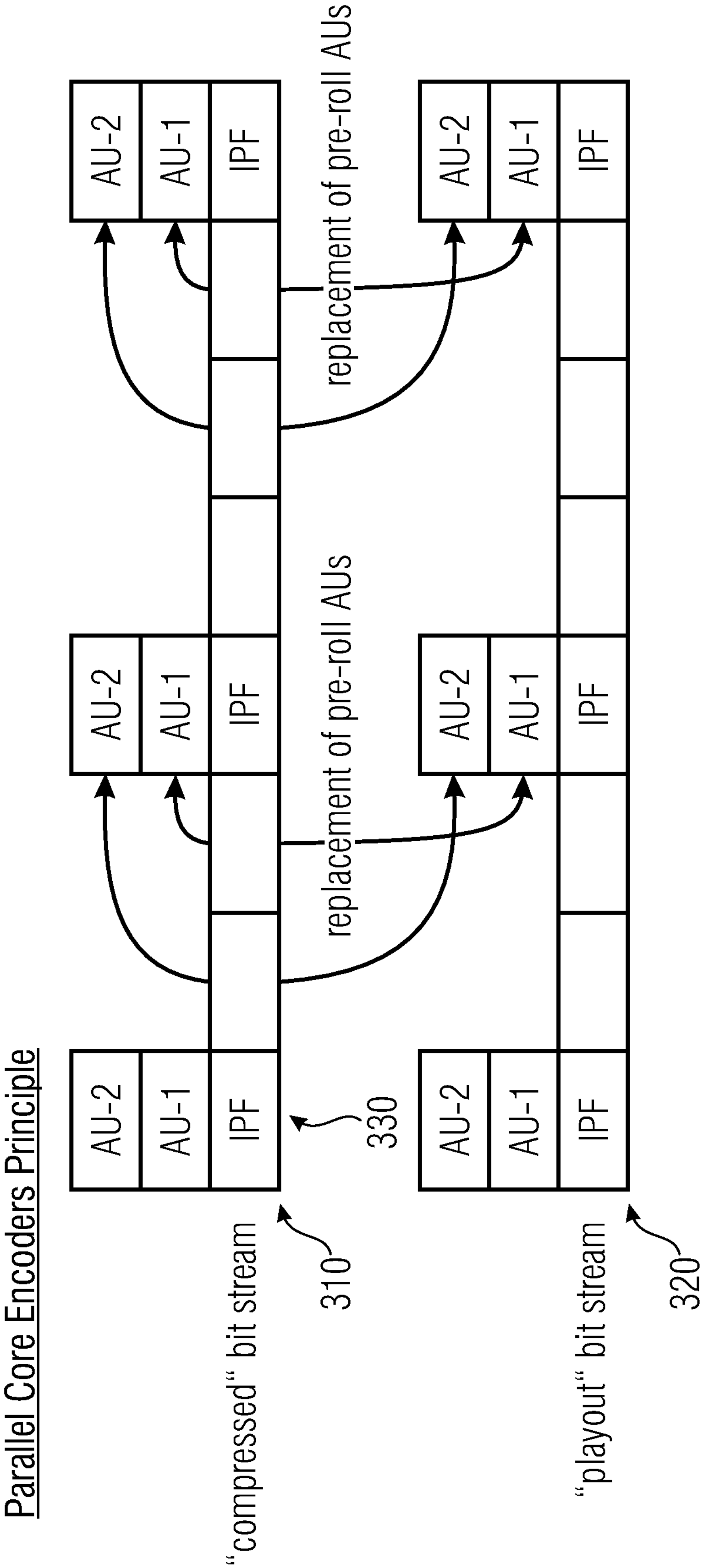
FIG. 3 shows a schematic view of a parallel core encoders principle, according to embodiments of the invention.

In the following, reference is made to FIG. 3. FIG. 3 shows a schematic view of a parallel core encoders principle, according to embodiments of the invention. FIG. 3 shows a visualization of a "compressed" bit stream 310 and of a "playout" bit stream 320. Signal 132 of FIG. 1 may, for example, comprise bit stream 310 and signal 122 may, for example, comprise bitstream 320. Hence, "compressed" bit stream 310 may, for example, be a modified bit stream, as a result of modified encoding unit 130 and "playout" bitstream 310 may, for example, be a normally encoded bitstream, as a result of "normal" encoding unit 120.

As shown in FIG. 3, an IPF may, comprise, as explained before, not only the previous AU(n−1), but a plurality of preceding access units, as examples, AU(n−1) and AU(n−2). For example, both the regular and the parallel core encoder, e.g. units 120 and 130 as shown in FIG. 1, may take the exact same audio signal as their input data, for example, to produce their respective encoded bit streams, e.g. 122 and 132 as shown in FIG. 1. For example, except for the Audio Pre-Roll access units, all other output, e.g. in signal 134 as shown in FIG. 1, from the parallel encoder can be discarded, e.g. using IPF provision unit 140, as shown in FIG. 1. For example, the number of available bits for encoding the subsequent access units (i.e. the bit reservoir fill level) is adapted, for example, while accounting for the reduced size of the IPF resulting from the smaller sized Audio Pre-Rolls. The parallel encoder, e.g. modified encoding unit 130 in FIG. 1, may, for example, be configured in a way, so that the resulting decoder configuration, for example, as contained in the respective bitstream syntax element, is the same for both core encoders. This is in some cases important to ensure the stream switching capability, where the decoder configuration is taken, for example, from the Audio Pre-Roll config extension, for example, in order to re-initialize the decoder. For example, the used decoder configuration should be (or in some cases has to be) applicable to the Audio Pre-Roll access units, as well as to all subsequent playout access units.

In the following effects and advantages of the solutions described in the above section "solution" are described.

It should be noted that one or more of the advantages mentioned herein may be achieved in embodiments of the invention. However, it is not necessary to achieve the advantages discussed here.

For example, the presented solution allows the creation of IPFs that are greatly reduced in size, for example, while keeping their basic properties. By using, for example, a parallel core encoder instance, e.g. "normal" encoding unit 120 and modified encoding unit 130 as shown in FIG. 1, the size reduction can be performed in a very flexible way and leaves a lot of opportunities for adaptations and tunings. Such, it can, for example, be assured that the IPFs still allow for seamless switching.

The compressed Audio Pre-Roll frames can, for example, be reduced in size such that decoder buffer violations and crashes are avoided. In addition, the audio quality may, for example, improve because the saved bits can be spend on the actual playout frames now instead of the Audio Pre-Roll.

In summary: (examples, optional, can be present individually or in combination):

- More balanced bit demand of frames in an audio bit stream, which reduces the need for sophisticated and error-prone bit rate control strategies;
- More balanced audio quality across the frames of an audio stream;
- Overall increased audio quality due overall increased bit budget for all non-IPF frames;
- Increased range of bit rates that are guaranteed to respect decoder buffer requirements and maximum AU size requirements, leading to:
- More stable decoder behavior.

In the following alternative solutions according to embodiments of the invention are discussed. It is to be noted that one or more of the solutions described herein may optionally be used in embodiments according to the invention:

- Parallel Encoders where the Audio Pre-Roll extension payload is replaced on a layer higher than the core encoder;
- Omitting the parallel core encoder concept, and retroactively shrinking the Audio Pre-Rolls, that were encoded by the regular core encoder;
- Using only one core encoder, but operating it in a way such that it encodes the Audio Pre-Rolls two times in two different representations.

In the following features and functionalities which are optionally present in embodiments according to the invention are presented:

Immediate Playout Frames in xHE-AAC bitstreams (.mp4) or MPEG-H 3D Audio bitstreams (.mhas) have Audio Pre-Roll access units, that are not matching the access units directly preceding the IPF.

Furthermore, in the following examples for technical application areas for embodiments according to the invention are disclosed: This invention is applicable, for example, to

- Fraunhofer MPEG-D USAC/xHE-AAC encoder
- Fraunhofer MPEG-H 3D audio encoder and all variants thereof
- all encoding strategies that make use of transmitting/storing temporally preceding frames within a currently transmitted/stored frame.

The described invention can, for example, be used as an audio encoder tool to reduce the bit demand of IPFs and thus to increase the perceived audio quality. It can also, for example, be used as an emergency strategy of the encoder in cases where the bit demand of a particular signal is too big to be encoded with the available bits. In these cases the IPF sizes can, for example, be reduced to a point where the signal can be safely encoded again, without the risk of running out of bits or crashing the encoder.

In the following further embodiments are described and further details and aspects of the invention are disclosed. The following section may be titled “Possible approaches for Audio Pre-Roll size reduction, for example in parallel core encoder”, hence in particular highlighting features of such embodiments:

Words formatted in bold represent bitstream syntax elements in the relevant ISO/IEC standards (e.g. for 23003-3 MPEG-D USAC or 23008-3 MPEG-H 3D Audio). Words formatted in italic represent bitstream syntax tables in the above standards.

It should be noted that any of the concepts described in the following may optionally be introduced into any of the embodiments disclosed in this document. Moreover, it should be noted that any of the concepts described in the following may optionally be used (or introduced into other embodiments) individually or in combination.

1. Reduce Bitrate (Example)

A straight forward way to produce smaller-sized access units, and therefore smaller Audio Pre-Rolls, for example, with the parallel core encoder, e.g. modified encoding unit 130 as shown in FIG. 1, is to operate it (or, for example, a modified encoding functionality) using a smaller bitrate than the regular core encoder (or, for example, a normal encoding functionality), e.g. “normal” encoding unit 120 as shown in FIG. 1. This has, for example, one or several effects on the encoding process, for example:

- A coarser quantization, because the number of available bits is reduced; and/or
- A smaller core bandwidth, i.e. a smaller lower frequency band that will be encoded directly, and not by using the Spectral Band Replication (SBR) tool
  - Since the SBR frequency range in the higher frequencies remains unchanged, a smaller core bandwidth (with a lower core band cut-off frequency) will result in a gap between the LF core band and the HF SBR band It is important to note, that, for example, only those parameters shall be affected, that would not change the resulting decoder configuration (e.g. the usacConfig( ) syntax element for USAC, or the mpegh3daConfig( ) syntax element for MPEG-H 3D Audio) in the produced Audio Pre-Rolls.

2. Dequantization of the Frequency Spectrum (Example)

Here, the access unit size is, for example, reduced by applying a coarser quantization of, for example, the MDCT spectrum, for example, with a larger quantization step size. A coarser quantization will most likely also happen with the reduced bitrate approach from Point 1. The difference here is, for example, that the bit-demand is only controlled by manipulating the quantization part, while, for example, leaving all other parameters like, for example, the core bandwidth unchanged.

One way to achieve this is, for example, to reduce the maximum amount of bits that are available for quantizing the spectrum. The frequency spectrum will then, for example, be requantized with an increasing quantization step-size, for example, until the adapted bit-constraint is fulfilled, and the quantized spectrum, for example, only “consumes” up to the set maximum number of bits.

Another way could be, for example, to force the encoder to requantize the spectrum, for example, by increasing the global gain parameter. In the decoder, the global_gain is, for example, used to re-scale the spectrum after the inverse quantization. On the encoder side, increasing the global gain will, for example, result in a larger quantization step size, leading to smaller quantized values [Karlheinz Brandenburg—MP3 and AAC explained—AES-17-Conference].

3. Removal of SBR Payload Content (Example)

Reduce the size of the SBR payload, so that, for example, it only contains the data that is strictly necessary so that the decoder is still able to interpret it. This means, for example, that (parts of) the contents of UsacSbrData( ) may be reduced/removed, to realize, for example, the smallest sensible SBR payload size. SBR parameters like, for example, coreSbrFrameLengthIndex, that are part of the usacConfig( )/SbrConfig( ) syntax element shall, for example, remain unchanged.

4. Reduce Number of SBR Envelopes (Example)

The number of SBR envelopes can, for example, be reduced, for example, to 1, for example, in order to minimize the frequency resolution of the SBR data, as contained in the UsacSbrData( ) syntax element in the current audio frame payload. This will, for example, result in a smaller SBR grid, and therefore a smaller SBR payload size in the Audio Pre-Rolls.

5. Adapt the ACELP Mode (Example)

Another way of reducing the AU size in the linear prediction domain (LPD) core mode, is, for example, to change the used ACELP mode index for the encoding. This will, for example, result in different acelp_core_mode, and therefore a icb_index value that can be represented with fewer bits per ACELP frame. This way, in the extreme case, the bits needed to represent icb_index in the bitstream will, for example, be reduced from 64 bits (ACELP mode 5) to 12 bits (ACELP mode 6). An example of the exact mapping from the acelp_core_mode to the icb_index is shown in Table 1.

6. Re-Code ACELP Frames with TCX (Example)

Apart from the ACELP mode, the LPD core also employs, for example, a MDCT based TCX (transform coded excitation) mode, which operates in the frequency domain. The data reduction in TCX is, for example, based on quantization of the frequency spectrum. Therefore the requantization techniques as described, for example, in Point 2. can optionally also be applied here, to reduce the size of the resulting access unit.

7. "Join" Two or Four Shorter TCX Windows to One Larger Window (Example)

In this approach the idea is, for example, to reduce the time domain resolution of the TCX coder in the LPD core mode, for example, for each audio frame. This can be done, for example, by only using 1 long TCX window, instead of, for example, 2 medium sized of 4 short windows.

8. Replace EIGHT_SHORT with STOP_START (Example)

To improve the audio quality of transients after encoding and decoding, a common way is to subdivide one frame of audio samples (a.k.a a long-block) into 8 short-blocks on the encoder side. This is to prevent the quantization noise to spread before the onset of the transient, where it would be very audible.

However, encoding 8 short-blocks, instead of only 1 long-block consumes significantly more bits. To reduce the size of the Audio Pre-Rolls, the sequence of 8 short-blocks can, for example, be replaced by one long START_STOP window, to decrease temporal granularity again. Table 2 (from Table 93 in the 23003-3 MPEG-D USAC specification showing an example for a window sequences and transform windows dependent of coreCoderFrameLength (ccfl)) shows, as an example, the different window sequences, with the 8 short-block sequence and the START_STOP window highlighted (e.g. in yellow or by a background shading).

Furthermore it is to be noted that embodiments may address or may be used with or may comprise or may be related to any of the following: IPF, USAC, xHE-AAC, Seamless Switching, Audio Pre-Roll, Adaptive Streaming, Audiocoding.

Embodiments may be related to audiocoding with xHE-AAC and/or MPEG-H 3D Audio encoders. Embodiments may be used with or may address xHE-AAC encoder and/or MPEG-H 3D Audio encoder.

In general, embodiments according to the invention may comprise or may be a framework that may allow for exchanging bit demanding or even the most bit demanding parts of an Immediate Playout Frame (IPF) with compressed representations. The purpose of this framework may, for example, be to reduce the size of the IPF by replacing the original Audio Pre-Roll Access Units (AU) with compressed versions that may, for example, be created by a second core encoder instance that may, for example, run in parallel to the already existing core encoder instance. The parallel core encoder (e.g. modified encoding unit) may be configurable in various flexible ways, to allow the creation of Audio Pre-Roll AUs that are smaller in size than the Audio Pre-Roll AUs of the original bit stream (e.g. normally encoded bitstream), e.g. while keeping the basic properties of the IPF (e.g. Seamless Switching between two streams of different audio quality). These Audio Pre-Rolls may, for example, then be taken to replace the Audio Pre-Roll of the original bit stream and such reduce the total size of the resulting IPF.

One approach according to embodiments to reduce the size of the Audio Pre-Roll AU may be to operate the parallel core encoder at a lower bitrate, while keeping the rest of the encoder configuration in sync. Another approach according to embodiments may be to requantize the MDCT coefficient with a larger quantization step size, leading to a lower bit consumption.

REMARKS

It should be noted that any embodiments as defined by the claims can be supplemented by any of the details (features and functionalities) described in the above sections of the description.

Also, the embodiments described in the above sections can be used individually, and can also be supplemented by any of the features in another section, or by any feature included in the claims.

Also, it should be noted that individual aspects described herein can be used individually or in combination. Thus, details can be added to each of said individual aspects without adding details to another one of said aspects.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can optionally be supplemented by any of the features and functionalities described with respect to the apparatuses, both individually and taken in combination.

Also, any of the features and functionalities described herein can be implemented in hardware or in software, or using a combination of hardware and software, as will be described in the section "implementation alternatives".

IMPLEMENTATION ALTERNATIVES

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed:

1. An audio encoder for providing an encoded representation of an audio information on the basis of an input audio information, wherein the audio encoder is configured to encode a sequence of audio frames, wherein the audio encoder is configured to provide one or more immediate playout frames comprising a representation of a current audio frame and encoded representations of one or more audio frames preceding the current audio frame, wherein the audio encoder is configured to provide the representation of the current frame and the representations of the one or more audio frames preceding the current audio frame such that the representation of the current frame and the representations of the one or more audio frames preceding the current audio frame are decodable using a same decoder configuration, and wherein the audio encoder is configured to provide the representations of the one or more audio frames preceding the current audio frame, which are included into the immediate playout frame, using a modified encoding functionality which is adapted to encode an audio frame using a smaller number of bits than a normal encoding functionality which is used for the encoding of the current audio frame.

2. The audio encoder according to claim 1, wherein the audio encoder is configured to use a modified encoding functionality, in which a bitrate setting or a bitrate limit is reduced when compared to the normal encoding functionality, for providing the representations of the one or more audio frames preceding the current audio frame.

3. The audio encoder according to claim 1, wherein the audio encoder is configured to use the bitrate setting or bitrate limit for deciding how many bits are allocated to an encoding of different spectral values.

4. The audio encoder according to claim 1, wherein the audio encoder is configured to leave encoding parameters, a change of which would result in a change of a decoder configuration unchanged between the encoding of the current frame and the encoding of the one or more audio frames preceding the current audio frame.

5. The audio encoder according to claim 1, wherein the audio encoder is configured to use a modified encoding functionality, in which a number of bits available for a quantization or for an encoding of one or more parameters is reduced or limited when compared to normal encoding functionality, for providing the representations of the one or more audio frames preceding the current audio frame.

6. The audio encoder according to claim 1, wherein the audio encoder is configured to use a modified encoding functionality, in which a coarser quantization of a MDCT spectrum is used when compared to the normal encoding functionality, for providing the representations of the one or more audio frames preceding the current audio frame.

7. The audio encoder according to claim 1, wherein:
the audio encoder is configured to change a global gain parameter, in order to acquire a coarser quantization, when using the modified encoding functionality; and/or
the audio encoder is configured to use a modified encoding functionality, in which a masking threshold acquired using a psychoacoustic model is changed to acquire a coarser quantization, for providing the representations of the one or more audio frames preceding the current audio frame.

8. The audio encoder according to claim 1, wherein the audio encoder is configured to use a modified encoding functionality, and a bandwidth extension bit load is reduced, for providing the representations of the one or more audio frames preceding the current audio frame.

9. The audio encoder according to claim 1, wherein the audio encoder is configured to use a modified encoding functionality, and wherein:
a spectral band replication bit load is reduced, for providing the representations of the one or more audio frames preceding the current audio frame; and/or
a plurality of spectral band replication parameters are set to a predetermined value which allows for a reduction or for a minimization of a number of bits required for an encoding of the spectral band replication parameters, for providing the representations of the one or more audio frames preceding the current audio frame.

10. The audio encoder according to claim 1, wherein the audio encoder is configured to use a modified encoding functionality, and wherein:
a number of spectral band replication bands or a number of spectral band replication envelopes is reduced, for providing the representations of the one or more audio frames preceding the current audio frame; and/or
a frequency resolution of spectral band replication data is reduced, for providing the representations of the one or more audio frames preceding the current audio frame.

11. The audio encoder according to claim 1, wherein the audio encoder is configured to use a modified encoding functionality, and wherein:
a bit load in a UsacSbrData( ) syntax element is reduced, for providing the representations of the one or more audio frames preceding the current audio frame, while keeping spectral band replication parameters which are part of an usacConfig( ) syntax element and/or of a SbrConfig( ) syntax element unchanged; and/or
a multi-channel encoding bit load is reduced, for providing the representations of the one or more audio frames preceding the current audio frame.

12. The audio encoder according to claim 1, wherein the audio encoder is configured to use a modified encoding functionality, and wherein:
a transform-coded excitation linear-prediction domain encoding is used instead of an ACELP linear predication domain encoding, for providing the representations of the one or more audio frames preceding the current audio frame; and/or
a transform-coded excitation linear-prediction domain encoding with a coarser quantization is used instead of a transform-coded excitation linear-prediction domain encoding with a finer quantization, for providing the representations of the one or more audio frames preceding the current audio frame.

13. The audio encoder according to claim 1, wherein the audio encoder is configured to use a modified encoding functionality, and wherein:
a time domain resolution is reduced, for providing the representations of the one or more audio frames preceding the current audio frame; and/or
a usage of multiple TCX windows within a single audio frame is avoided, for providing the representations of the one or more audio frames preceding the current audio frame.

14. The audio encoder according to claim 1, wherein the audio encoder is configured to use a modified encoding functionality, and wherein:
a single long TCX window is used instead of 2 medium sized TCX windows, and/or in which a single long TCX window is used instead of 4 short TCX windows, or in which a single long TCX window is used instead of a plurality of shorted TCX windows, for providing the representations of the one or more audio frames preceding the current audio frame; and/or
a usage of a plurality of short MDCT transform windows within a single audio frame is avoided, for providing the representations of the one or more audio frames preceding the current audio frame.

15. The audio encoder according to claim 1, wherein the audio encoder is configured to use a modified encoding functionality, and wherein
a single long MDCT transform window is used instead a plurality of shorter MDCT transform windows, for providing the representations of the one or more audio frames preceding the current audio frame; and/or;
a "START_STOP" MDCT transform window is used instead of an "EIGHT_SHORT" MDCT transform window, for providing the representations of the one or more audio frames preceding the current audio frame.

16. The audio encoder according to claim 1, wherein the audio encoder is configured to use a modified encoding functionality, and wherein:
a reduced ACELP excitation codebook size is used, for providing the representations of the one or more audio frames preceding the current audio frame; and/or
a reduced number of bits is used for an encoding of an innovation codebook index representing an ACELP excitation, for providing the representations of the one or more audio frames preceding the current audio frame.

17. The audio encoder according to claim 1, wherein the audio encoder is configured to also encode the one or more audio frames preceding the current audio frame in the normal encoding mode, in order to acquire one or more non-immediate playout frames preceding the immediate playout frame.

18. The audio encoder according to claim 1, wherein the audio encoder is configured to re-use intermediate encoding results of an encoding of the one or more frames preceding the current frame using the normal encoding functionality, in order to determine the bitrate reduced encoded representation of the one or more frames preceding the current frame which is the result of the modified encoding functionality.

19. The audio encoder according to claim 1, wherein the audio encoder is configured to implement the normal encoding functionality using a first core coder instance, and to implement the modified encoding functionality using a second core coder instance.

20. A method for providing an encoded representation of an audio information on the basis of an input audio information, the method comprising:

encoding a sequence of audio frames;

providing one or more immediate playout frames comprising a representation of a current audio frame and encoded representations of one or more audio frames preceding the current audio frame;

providing the representation of the current frame and the representations of the one or more audio frames preceding the current audio frame such that the representation of the current frame and the representations of the one or more audio frames preceding the current audio frame are decodable using a same decoder configuration, and providing the representations of the one or more audio frames preceding the current audio frame, which are included into the immediate playout frame, using a modified encoding functionality which is adapted to encode an audio frame using a smaller number of bits than a normal encoding functionality which is used for the encoding of the current audio frame.

21. A non-transitory digital storage medium having a computer program stored that when executed by a computer process provides an encoded representation of an audio information on the basis of an input audio information by:

encoding a sequence of audio frames;

providing one or more immediate playout frames comprising a representation of a current audio frame and encoded representations of one or more audio frames preceding the current audio frame;

providing the representation of the current frame and the representations of the one or more audio frames preceding the current audio frame such that the representation of the current frame and the representations of the one or more audio frames preceding the current audio frame are decodable using a same decoder configuration, and providing the representations of the one or more audio frames preceding the current audio frame, which are included into the immediate playout frame, using a modified encoding functionality which is adapted to encode an audio frame using a smaller number of bits than a normal encoding functionality which is used for the encoding of the current audio frame.

* * * * *